(12) United States Patent
Kuramitsu et al.

(10) Patent No.: US 10,759,470 B2
(45) Date of Patent: Sep. 1, 2020

(54) SENSOR DEVICE AND ELECTRIC POWER STEERING APPARATUS USING SAME

(71) Applicant: DENSO CORPORATION, Kariya, Aichi-pref. (JP)

(72) Inventors: Shuji Kuramitsu, Kariya (JP); Katsuhiko Hayashi, Kariya (JP); Takaharu Kozawa, Kariya (JP); Koichi Nakamura, Kariya (JP); Masaya Taki, Kariya (JP); Toshimitsu Sakai, Kariya (JP)

(73) Assignee: DENSO CORPORATION, Kariya, Aichi-Pref. (JP)

( * ) Notice: Subject to any disclaimer, the term of this patent is extended or adjusted under 35 U.S.C. 154(b) by 289 days.

(21) Appl. No.: 15/158,189

(22) Filed: May 18, 2016

(65) Prior Publication Data
US 2016/0339946 A1    Nov. 24, 2016

(30) Foreign Application Priority Data

May 20, 2015  (JP) .................................. 2015-102772

(51) Int. Cl.
  *B62D 5/04*  (2006.01)
  *G01L 3/10*  (2006.01)
  *B62D 6/10*  (2006.01)
  *G01L 5/22*  (2006.01)

(52) U.S. Cl.
  CPC ........... *B62D 5/0421* (2013.01); *B62D 5/049* (2013.01); *B62D 5/0442* (2013.01); *G01L 3/104* (2013.01); *B62D 6/10* (2013.01); *G01L 5/221* (2013.01)

(58) Field of Classification Search
  CPC ......... G01L 5/221; G01L 3/104; G01L 3/101; B62D 5/0463; B62D 6/10; B62D 6/04;
  (Continued)

(56) References Cited

U.S. PATENT DOCUMENTS

| | | | |
|---|---|---|---|
| 6,990,415 B2* | 1/2006 | K pken ................ | G01R 15/185 324/547 |
| 2004/0204875 A1* | 10/2004 | Kopken ............... | G01R 15/185 702/64 |

(Continued)

FOREIGN PATENT DOCUMENTS

| | | | | |
|---|---|---|---|---|
| CN | 106168520 A | * | 11/2016 | ........... B65D 5/0421 |
| DE | 102016208430 A1 | * | 11/2016 | ........... B62D 5/0421 |

(Continued)

OTHER PUBLICATIONS

Non-conduct steering sensor for Electric Power Steering; Wang Xiaoling ; Zhao Yan ; Wang Hong; 2009 International Conference on Information and Automation; pp. 1462-1467; IEEE Conferences; year 2009.*

(Continued)

*Primary Examiner* — Cuong H Nguyen
(74) *Attorney, Agent, or Firm* — Maschoff Brennan

(57) ABSTRACT

A sensor device includes a sensor section having a plurality of sensor elements sensing a physical quantity regarding a magnetic flux collecting module, an output circuit generating and outputting an output signal including data signals respectively corresponding to sensing values from the sensor elements, and an ECU obtaining the output signal. The ECU includes an abnormality determiner identifying an abnormal sensor element. When at least two of the plurality of sensor sections respectively have at least one normal sensor element, a sub-sensor section transmits the output signal therefrom to the ECU at a shifted output timing from an output timing of the output signal from a main sensor section. The amount of such a shift of the output timing is shorter than one signal cycle of the output signal.

13 Claims, 11 Drawing Sheets

(58) Field of Classification Search
CPC .... B62D 5/0421; B62D 5/0442; B62D 5/049; B62D 5/0406; H02P 31/00
USPC ....... 701/29.2, 29.9, 34, 29.7; 180/422, 412, 180/443, 446; 324/207.13; 73/862.193
See application file for complete search history.

(56) References Cited

U.S. PATENT DOCUMENTS

| | | | | |
|---|---|---|---|---|
| 2011/0098881 | A1* | 4/2011 | Tsutsumi | B60K 6/445 701/29.2 |
| 2012/0158335 | A1* | 6/2012 | Donovan | G05B 19/0423 702/79 |
| 2013/0253773 | A1* | 9/2013 | Itamoto | B62D 5/049 701/43 |
| 2016/0339946 | A1* | 11/2016 | Kuramitsu | B62D 5/0421 |
| 2017/0029016 | A1* | 2/2017 | Kozawa | B62D 5/0463 |
| 2017/0029022 | A1* | 2/2017 | Nakamura | B62D 5/0409 |
| 2017/0050670 | A1* | 2/2017 | Kuramitsu | B62D 5/0484 |

FOREIGN PATENT DOCUMENTS

| | | | | |
|---|---|---|---|---|
| DE | 102019122434 | A1 * | 8/2018 | ........... B62D 5/0406 |
| JP | 2016217869 | A * | 12/2016 | ............. B62D 5/049 |
| JP | 2017169382 | A * | 9/2017 | .............. H02P 31/00 |

OTHER PUBLICATIONS

Electric power steering with Permanent magnet synchronous motor drive used in automotive application; R. G. Shriwastava ; M. B. Diagavane; 2011 1st International Conference on Electrical Energy Systems; pp. 145-148p IEEE Conferences, year 2011.*
Hardware-in-the-loop simulation of fault tolerant control for an electric power steering system; Matthew Lawson ; Xiang Chen; 2008 IEEE Vehicle Power and Propulsion Conference; pp. 1-6; IEEE Conferences year: 2008.*
U.S. Appl. No. 15/158,283, May 18, 2016, Takaharu Kozawa, et al.
U.S. Appl. No. 15/158,207, May 18, 2016, Koichi Nakamura, et al.
U.S. Appl. No. 15/086,648, Mar. 31, 2016, Kozawa, et al.

* cited by examiner

SENSOR DEVICE AND ELECTRIC POWER STEERING APPARATUS USING SAME

CROSS REFERENCE TO RELATED APPLICATION

The present application is based on and claims the benefit of priority of Japanese Patent Application No. 2015-102772, filed on May 20, 2015, the disclosure of which is incorporated herein by reference.

TECHNICAL FIELD

The present disclosure generally relates to a sensor device and an electric power steering apparatus using the sensor device.

BACKGROUND INFORMATION

Generally, a sensor device sends sensor data to a controller. For example, in a patent document, Japanese Patent Laid-Open No. 2013-546096 (Patent document 1) listed below, the transmission of sensor data is synchronized by using a trigger signal that is generated by the controller and is received by a bi-directional node.

In such case, when the controller receives signal data from plural sensors at the same timing, the update cycle of the data on the controller side is the same as a signal cycle. Thus, the update cycle of the data on the controller side cannot be shorter than the signal cycle. Further, the patent document 1 is silent about a sensor data abnormality case (i.e., what happens when the sensor data has abnormality).

SUMMARY

In view of the above, it is an object of the present disclosure to provide a sensor device that is capable of increasing a data update frequency of a controller even when a part of the sensor elements has abnormality, and an electric power steering apparatus using such a sensor device.

In an aspect of the present disclosure, the sensor device is provided with a plurality of sensor sections and a controller.

The plurality of sensor sections are respectively equipped with a plurality of sensor elements sensing a physical quantity of a sensing object and an output circuit generating and transmitting an output signal, which includes data signals respectively corresponding to sensing values sensed by the plurality of sensor elements.

The sensor device also includes a controller that obtains the output signal from the sensor sections. The controller or the sensor section has an abnormality determiner identifying an abnormal sensor element (i.e., a sensor element having abnormality).

When at least one sensor element is normal in at least two sensor sections from among the plurality of sensor sections, the output timing of the output signal from one of the at least two sensor sections is shifted from the output timing of the output signal from the other sensor sections, by an amount of shift that is shorter than one signal cycle of the output signal.

According to the present disclosure, when the plurality of sensor sections are provided in the sensor device, the signal output timings from the plurality of sensor sections are shifted from each other (i.e., from the output timings of the other sensor sections), by a shift amount that is shorter than one signal cycle. In such manner, the data update frequency of the controller is increased in the sensor device of the present disclosure than the one having the output signals transmitted from the plurality of sensor sections all at the same output timing, which improves a communication speed on appearance.

Further, the abnormality determiner capable of identifying a sensor element having abnormality enables the continuation of calculation based on sensing values from normal sensor elements. Further, when at least two sensor sections have at least one normal sensor element, the data update frequency on the controller side is improvable by shifting the transmission timings of the output signals among the at least two sensor sections. In other words, even when some of the sensor elements in the sensor device have abnormalities, a high speed communication is substantially performable/continuable.

BRIEF DESCRIPTION OF THE DRAWINGS

Objects, features, and advantages of the present disclosure will become more apparent from the following detailed description made with reference to the accompanying drawings, in which.

DETAILED DESCRIPTION

Hereafter, a sensor device of the present disclosure is described based on the drawings. Like parts have like numbers in the following description, for the saving of the description of the same/like parts.

First Embodiment

The first embodiment of the present disclosure is described based on FIGS. 1-8.

Figure 1:
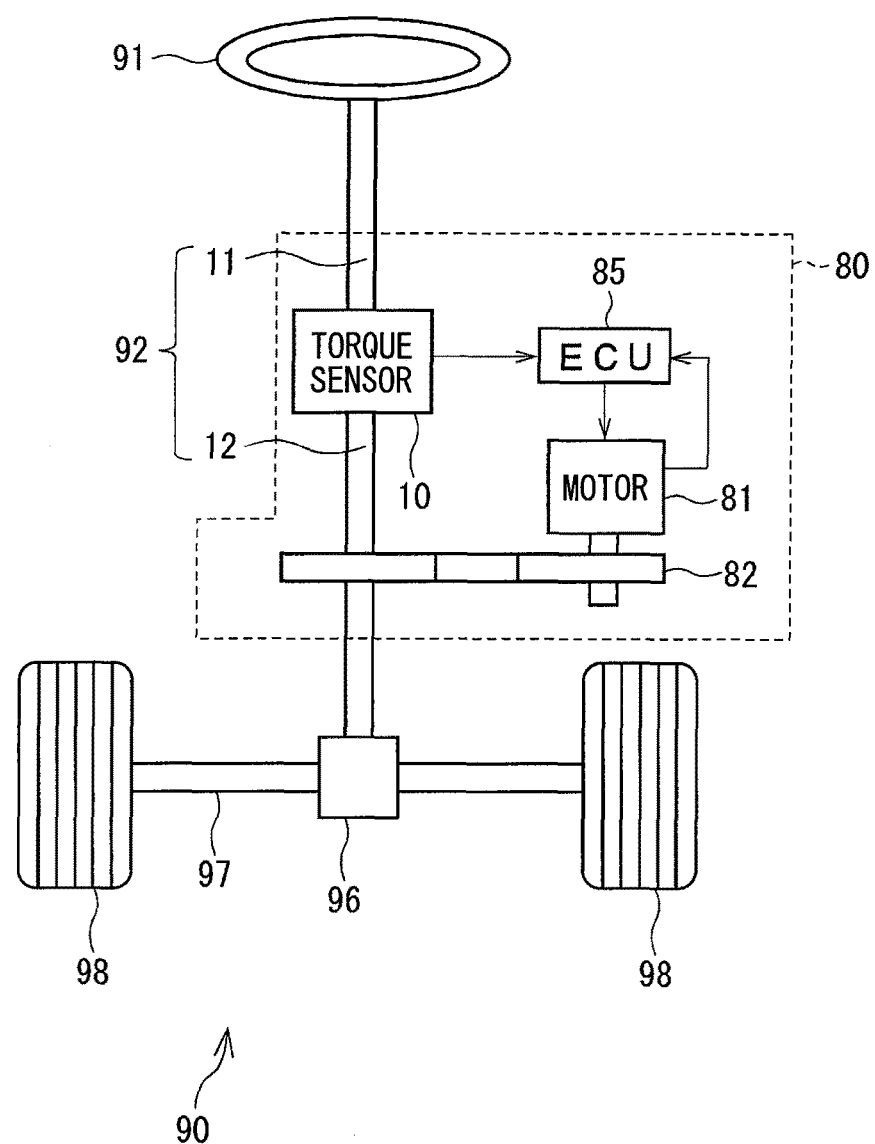
FIG. 1 is a schematic diagram of an electric power steering apparatus in a first embodiment of the present disclosure.
Figure 2:
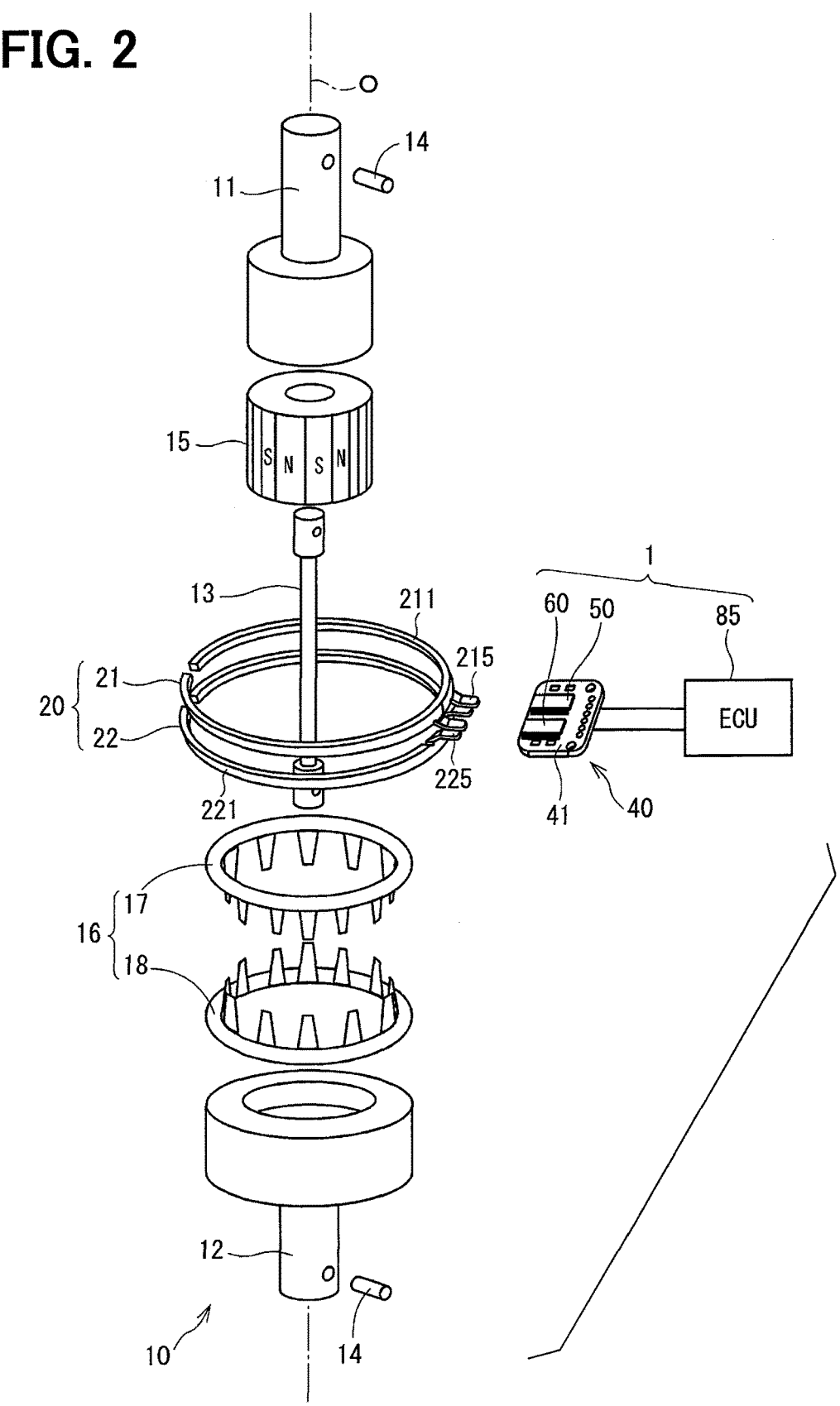
FIG. 2 is an exploded perspective view of a torque sensor in the first embodiment of the present disclosure.

As shown in FIGS. 1 and 2, a sensor device 1 having an Electronic Control Unit (ECU) 85 as a controller, and main magnetic sensor 50 and a sub magnetic sensor 60 is applied to an electric power steering apparatus 80, for, for example, assisting a steering operation of a vehicle.

The configuration of a steering system 90 provided with the electric power steering apparatus 80 is shown in FIG. 1.

A steering wheel 91 serving as a steering component is connected with a steering shaft 92.

The steering shaft 92 has an input shaft 11 as a first shaft, and an output shaft 12 as a second shaft. The input shaft 11 is connected with the steering wheel 91. At a position between the input shaft 11 and the output shaft 12, a torque sensor 10 sensing a torque is disposed on the steering shaft 92. A pinion gear 96 is disposed on one end of the output shaft 12 (i.e., on an opposite end of the output shaft 12 away from the input shaft 11). The pinion gear 96 engages with a rack shaft 97. On both ends of the rack shaft 97, a pair of wheels 98 are connected via a tie rod or the like.

When a driver of the vehicle rotates the steering wheel 91, the steering shaft 92 connected to the steering wheel 91 also rotates. The rotational movement of the steering shaft 92 is turned into the translational movement of the rack shaft 97 by the pinion gear 96, and the pair of wheels 98 are steered by a certain angle, according to an amount of displacement of the rack shaft 97.

The electric power steering apparatus 80 is provided with a speed reduction gear 82 (i.e., a power transmission part), the torque sensor 10, the ECU 85 and the like beside having a motor 81 that outputs an assist torque for assisting a steering operation of the steering wheel 91 by the driver. Although the motor 81 and the ECU 85 have two separate bodies in FIG. 1, they may also be combined to have one body.

The speed reduction gear 82 reduces a rotation speed of the motor 81, and transmits the rotation to the steering shaft 92. That is, even though the electric power steering apparatus 80 of the present embodiment is a "column assist type", the apparatus 80 may also be a "rack assist type" that transmits the rotation of the motor 81 to the rack shaft 97. In other words, although the steering shaft 92 is "a drive object" in the present embodiment, the rack shaft 97 may also be "a drive object".

Details of the ECU 85 are mentioned later.

As shown in FIG. 2, the torque sensor 10 is provided with the input shaft 11, the output shaft 12, a torsion bar 13, a multipolar magnet 15, a magnetic yoke 16, a magnetic flux collecting module 20, a sensor unit 40 and the like.

The torsion bar 13 has one end connected with the input shaft 11 and the other end connected with the output shaft 12 respectively by a pin 14, and puts both of the input/output shafts 11, 12 coaxially on the same rotation axis O. The torsion bar 13 is a cylindrical elastic member in a rod/bar shape, and converts a torque applied to the steering shaft 92 into a twist displacement.

The multipolar magnet 15 is a cylindrical member, and is fixedly attached to the input shaft 11. The multipolar magnet 15 is magnetized alternately to an N pole and an S pole along a circumferential direction The number of magnetic poles may arbitrarily be determined, which is, in the present embodiment, 12 poles both for N poles and S poles, totaling to 24 poles in 12 pairs.

The magnetic yoke 16 is held by a yoke holder member that is made with a nonmagnetic material (e.g. resin) (not illustrated), and serves as a magnetic circuit in the magnetic field generated by the multipolar magnet 15.

The magnetic yoke 16 has a first yoke 17 on one side close to the input shaft 11, and a second yoke 18 on the other side close to the output shaft 12. Both of the first yoke 17 and the second yoke 18 have an annular shape and are made with the soft magnetic material, and the first/second yokes 17, 18 are fixedly attached to the output shaft 12 on a radius outside the multipolar magnet 15.

The magnetic flux collecting module 20 has magnetic flux collecting rings 21 and 22. The magnetic flux collecting rings 21 and 22 are disposed on a radius outside of the magnetic yoke 16, and respectively collect the magnetic flux from the magnetic yoke 16. The first magnetic flux collecting ring 21 is disposed on the input shaft 11, and the second magnetic flux collecting ring 22 is disposed on the output shaft 12. The first magnetic flux collecting ring 21 and the second magnetic flux collecting ring 22 are respectively held by magnetic flux collecting ring holder members formed by an insert molding or the like (not illustrated).

The first magnetic flux collecting ring 21 has a ring part 211 formed substantially in a ring shape and two magnetic flux collecting parts 215 protruding from the ring part 211 toward a radius outside of the ring part 211. The magnetic flux collecting parts 215 is formed according to the number of sensor sections 55, 65. The second magnetic flux collecting ring 22 has, similar to the first ring 21, a ring part 221 formed substantially in a ring shape and two magnetic flux collecting parts 225 protruding from the ring part 221 toward a radius outside of the ring part 211. In the present embodiment, the first magnetic flux collecting ring 21 and the second magnetic flux collecting ring 22 have the same shape in substance.

The magnetic flux collecting parts 215 of the first magnetic flux collecting ring 21 and the magnetic flux collecting parts 225 of the second magnetic flux collecting ring 22 are arranged to have their facing surfaces extending in parallel with each other. The magnetic sensors 50 and 60 are disposed at a position between the magnetic flux collecting parts 215 and 225.

The sensor unit 40 has a substrate 41 and the magnetic sensors 50 and 60. The substrate 41 is formed in a substantially-rectangular plate shape, on which the magnetic sensors 50 and 60 are mounted. The magnetic sensors 50 and 60 are mounted on the same surface of the substrate 41.

The magnetic sensors 50 and 60 detect a magnetic flux density according to the amount of twist displacement and a twist displacement direction of the torsion bar 13, and output signals Sd11 and Sd12 to the ECU 85 by digital communications.

The configuration of the main magnetic sensor 50 and the configuration of the sub magnetic sensor 60 are substantially the same, and the sensors 50 and 60 are mounted side-by-side on the substrate 41, facing the same direction.

Each of the main magnetic sensor 50 and the sub magnetic sensor 60 has an Electrically Erasable Programmable Read-Only Memory (EEPROM) disposed in the sub magnetic sensor 60, which memorizes a configuration in which one of the two sensors 50, 60 serves as a main sensor, and in which one serves as a sub sensor. In the present embodiment, the main magnetic sensor 50 serves as a main sensor, and the sub magnetic sensor 60 serves as a sub sensor.

In the present embodiment, the main magnetic sensor 50 outputs an output signal Sd11 at a constant signal cycle (e.g., at a cycle of 1000 microseconds), and the sub magnetic sensor 60 outputs an output signal Sd12 at a timing of receiving a timing signal St from the main magnetic sensor 50.

In the following, parts of the main magnetic sensor 50 have numerals of 50 s and 500 s assigned to the parts of the main magnetic sensor 50, and parts of the sub magnetic sensor 60 have numerals of 60 s and 600 s assigned to the parts of the sub magnetic sensor 60, with the last one or two digits of 50/60 or 500/600 representing the same/similar parts/functions. Hereafter, the description is focused mainly on the main magnetic sensor 50, and with the description of a counterpart of the sub magnetic sensor 60 eliminated whenever appropriate.

Figure 3:
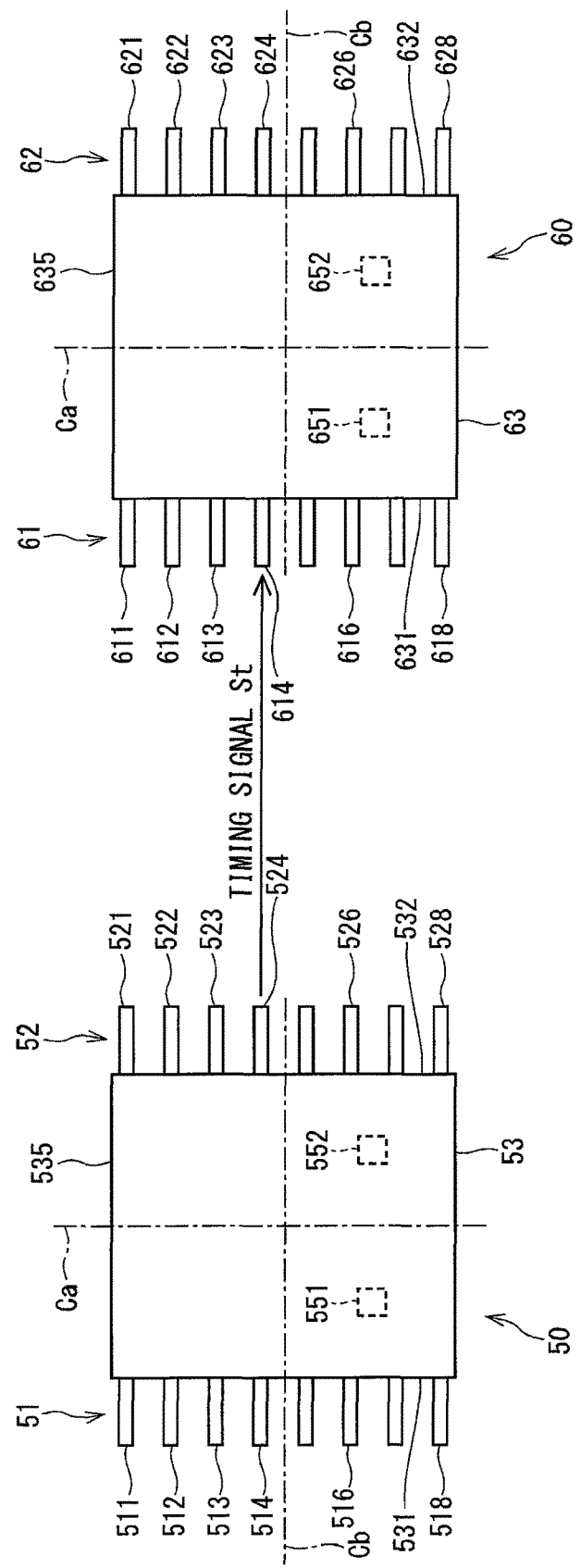
FIG. 3 is a plan view of a magnetic sensor in the first embodiment of the present disclosure.
Figure 4:
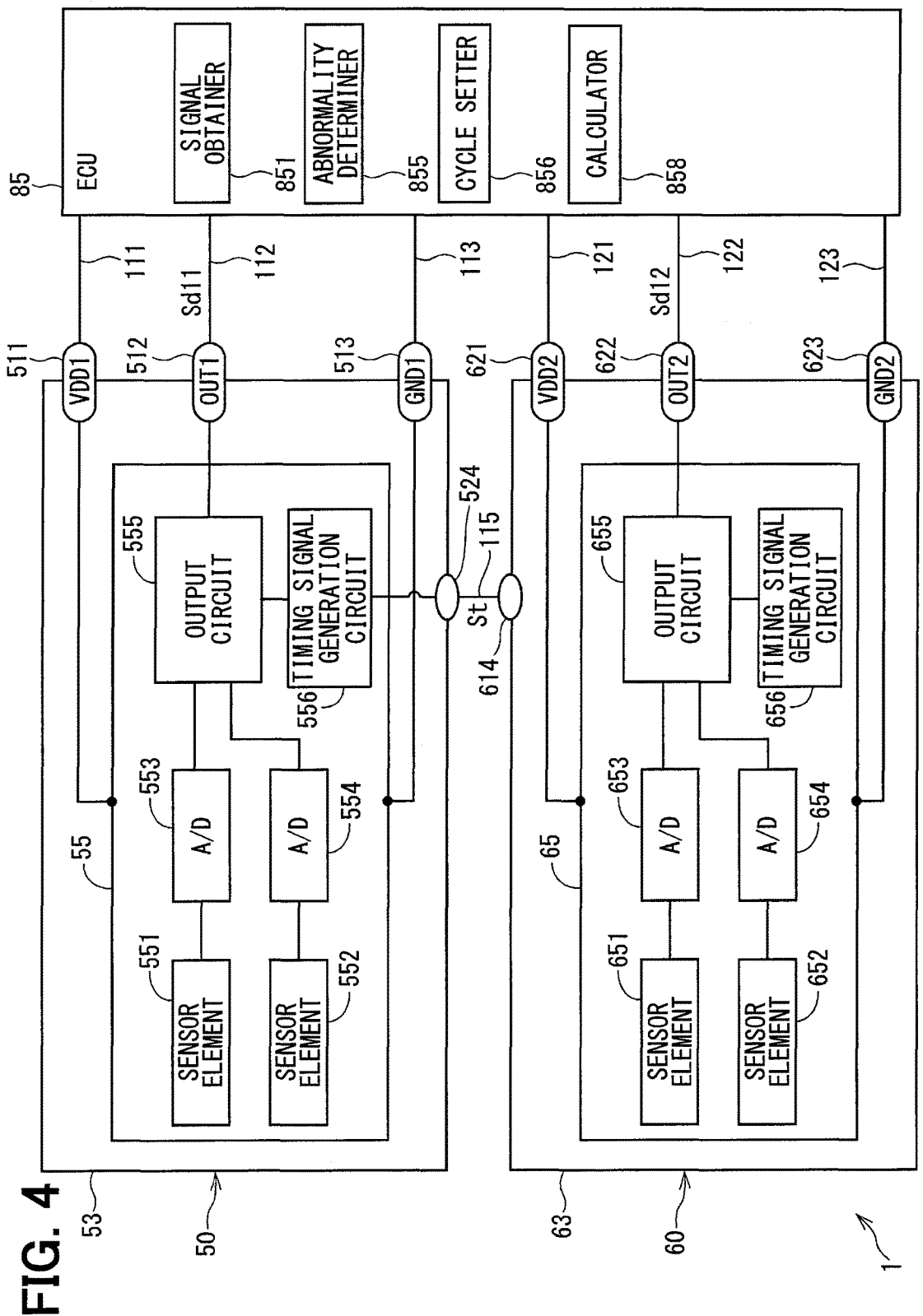
FIG. 4 is a block diagram of a sensor device in the first embodiment of the present disclosure.

As shown in FIGS. 3 and 4, the main magnetic sensor 50 has a first terminal group 51, a second terminal group 52, a sealed part 53, a main sensor section 55 and the like. Similarly, the sub magnetic sensor 60 has a first terminal group 61, a second terminal group 62, a sealed part 63, a sub sensor section 65 and the like.

As shown in FIG. 3, the first terminal group 51 and the second terminal group 52 respectively protrude from the sealed part 53. More practically, the first terminal group 51 protrudes from a first side surface 531 of the sealed part 53, the second terminal group 52 protrudes from a second side surface 532 of the sealed part 53, when the first side surface 531 is provided on one side of the sealed part 53 and the second side surface 532 is provided on the other (i.e., opposite) side of the main magnetic sensor 50. The first terminal group 51 and the second terminal group 52 are arranged in an axial symmetry to a central line Ca.

In the present embodiment, the first terminal group 51 of the main magnetic sensor 50, and the second terminal group 62 of the sub magnetic sensor 60 are positioned on an "outside" of a group of two sensors 50 and 60, respectively, and the second terminal group 52 of the main magnetic sensor 50 and the first terminal group 61 of the sub magnetic sensor 60 are positioned on an "inside" of the group of two sensors 50, 60, respectively.

The first terminal group 51 includes eight pieces of terminals, respectively designated as a first terminal 511 to an eighth terminal 518 arranged in order from one end 535 of the sealed part 53. Similarly, the second terminal group 52 includes eight terminals, respectively designated as a first terminal 521 to an eighth terminal 528 arranged in order from the one end 535 of the sealed part 53. In FIG. 3, no numeral is assigned to a terminal that has no relevant function in the present disclosure.

According to the present embodiment, in the first terminal group 51, the first terminal 511 may serve as a power supply terminal, as well as the second terminal 512 serving as a communication terminal and the third terminal 513 serving as a ground terminal. Further, in the second terminal group 52, the first terminal 521 may serve as the power supply terminal, as well as the second terminal 522 serving as the communication terminal and the third terminal 523 serving as the ground terminal.

Further, as the similar numbering scheme is applied to the sub magnetic sensor 60, which means, in the first terminal group 61, a first terminal 611 may serve as the power supply terminal, a second terminal 612 may serve as the communication terminal, and a third terminal 613 may serve as the ground terminal. In the second terminal group 62, a first terminal 621 serves as the power supply terminal, a second terminal 622 serves as the communication terminal, and a third terminal 623 serves as the ground terminal.

In the present embodiment, the arranged-on-outside terminals (i.e., the power supply terminals, the communication terminals, and the ground terminals of the first terminal group 51 of the main magnetic sensor 50 and of the second terminal group 62 of the sub magnetic sensor 60) are respectively connected with the ECU 85. More practically, the first terminal 511 serving as the power supply terminal of the main magnetic sensor 50 and the ECU 85 are connected by a power supply line 111, the second terminal 512 serving as the communication terminal and the ECU 85 are connected by a communication line 112, and the third terminal 513 serving as the ground terminal and the ECU 85 are connected by a ground line 113. Further, the first terminal 621 of the sub magnetic sensor 60 serving as the power supply terminal and the ECU 85 are connected by a power supply line 121, and the second terminal 622 serving as the communication terminal and the ECU 85 are connected by a communication line 122, and the third terminal 623 serving as the ground terminal and the ECU 85 are connected by a ground line 123 as shown in FIG. 4.

A voltage-adjusted electric power adjusted to a predetermined voltage (e.g., 5 [V]) is supplied to the power supply terminal from a regulator (not illustrated) of the ECU 85. The ground terminal is connected with the ground via the ECU 85.

Further, the terminals on an "inside" of a group of two sensors 50 and 60 (i.e., the power supply terminals, the communication terminals, and the ground terminals of the second terminal group 52 of the main magnetic sensor 50 and of the first terminal group 61 of the sub magnetic sensor 60) are not connected with the ECU 85 and are not used.

In the present embodiment, the timing signal St mentioned later is transmitted and received by the main magnetic sensor 50 and the sub magnetic sensor 60. Here, in the first terminal group 51 of the main magnetic sensor 50, an n th terminal from the one end 535 is used as a reception terminal and an m th terminal from the one end 535 is used as a transmission terminal, and, in the second terminal group 52 of the main magnetic sensor 50, an n th terminal from the one end 535 is used as the transmission terminal and an m th terminal from the one end 535 is used as the reception terminal.

Similarly, in the first terminal group 61 of the sub magnetic sensor 60, an n th terminal from the one end 635 is used as a reception terminal and an m th terminal from the one end 635 is used as a transmission terminal, and, in the second terminal group 62 of the sub magnetic sensor 60, an n th terminal from the one end 635 is used as the transmission terminal and an m th terminal from the one end 635 is used as the reception terminal. Note that, when the number of terminals in the first terminal groups 51, 61 and in the second terminal groups 52, 62 is designated as 'k', which is 8 in the present embodiment, the numbers n and m are natural numbers (i.e., integers) between 1 and k respectively, and the number n is not equal to the number m.

Therefore, the fourth terminals 514 and 614 from the one ends 535 and 635 in the first terminal groups 51 and 61 may respectively serve as the reception terminals, and the sixth terminals 516 and 616 from the one ends 535 and 635 in the first terminal groups 51 and 61 may respectively serve as the transmission terminals. Further, the fourth terminals 524 and 624 from the one ends 535 and 635 in the second terminal groups 52 and 62 may respectively serve as the transmission terminals, and the sixth terminals 526 and 626 from the one ends 535 and 635 in the second terminal groups 52 and 62 may respectively serve as the reception terminals.

In the present embodiment, the arranged-on-inside terminals (i.e., the transmission terminal (i.e., the fourth terminal 524) in the second terminal group 52 of the main magnetic sensor 50 and the reception terminal (i.e., the fourth terminal 614) of the first terminal group 61 of the sub magnetic sensor 60) are connected by a signal wire 115 (see FIG. 4.), and the timing signal St is transmitted from the fourth terminal 524 serving as the transmission terminal of the main magnetic sensor 50 to the fourth terminal 614 serving as the reception terminal of the sub magnetic sensor 60.

In the present embodiment, in terms of the reduction of the variation of parts in the sensor device, the main magnetic sensor 50 and the sub magnetic sensor 60 are the same sensor. Further, in the magnetic sensors 50 and 60, sensor elements 551, 552, 651, 652 are arranged away (i.e., at a shifted position) from a central line Cb, for holding the sensor elements 551, 552, 651, 652 at a position between the magnetic flux collecting parts 215 and 225. Therefore, when the magnetic sensors 50 and 60 have the same configuration, the magnetic sensors 50 and 60 must be disposed side-by-side for facing the same direction (i.e., facing opposite directions arrangement of the sensors 50 and 60 is not allowed based on such configuration). That is, the shift away position arrangement of the sensors 50 and 60 away from the central line Cb is allowed only by such arrangement of the magnetic sensor 50 and 60 on the substrate 41.

Thus, in the present embodiment, the main magnetic sensor 50 and the sub magnetic sensor 60 are respectively provided with terminals that may serve either as the power supply terminal, the communication terminal, the ground terminal, the reception terminal, or the transmission terminal.

Further, in the first terminal group 51 of the main magnetic sensor 50 and in the second terminal group 62 of the sub magnetic sensor 60, the power supply terminal, the communication terminal, and the ground terminal are positioned on an outside of a group of two sensors 50 and 60 for a connection to the ECU 85, thereby the circuit pattern on the substrate 41 is arranged.

Further, the timing signal St is transmitted from the transmission terminal of the second terminal group 52 of the main magnetic sensor 50 to the reception terminal of the first terminal group 61 of the sub magnetic sensor 60 (i.e., the signal St) is exchanged between the "inside" terminals, or between the adjacent terminals in the side-by-side arrangement of the sensors 50 and 60, also for the ease of the circuit pattern arrangement on the substrate 41, from the fourth terminal from the one end 535 on the transmission side in the second terminal group 52 of the main magnetic sensor 50 to the fourth terminal from the one end 635 on the reception side in the first terminal group 61 of the sub magnetic sensor 60.

The sealed part 53 seals the main sensor section 55 that is provided as a semiconductor chip, and is formed substantially in a rectangular shape in a plan/top view.

As shown in FIG. 4, the main sensor section 55 has the sensor elements 551 and 552, A/D-conversion circuits 553 and 554, an output circuit 555, a timing signal generation circuit 556 and the like.

The sensor elements 551 and 552 are magnetic flux sensing elements for sensing the magnetic flux between the magnetic flux collecting parts 215 and 225.

The sensor elements 551 and 552 of the present embodiment are the Hall elements.

The A/D-conversion circuit 553 performs an ND conversion of the sensing value sensed by the sensor element 551. The ND-conversion circuit 554 performs an ND conversion of the sensing value sensed by the sensor element 552.

The output circuit 555 generates an output signal Sd11 based on the sensing value sensed by the sensor elements 551 and 552 and converted by the A/D conversion. The output signal Sd11 generated in such manner is transmitted to the ECU 85 via the second terminal 512 that serves as the communication terminal. In the present embodiment, the output signal Sd11 is transmitted by a Single Edge Nibble Transmission (SENT) communication, which is a kind of digital communication.

Figure 5:
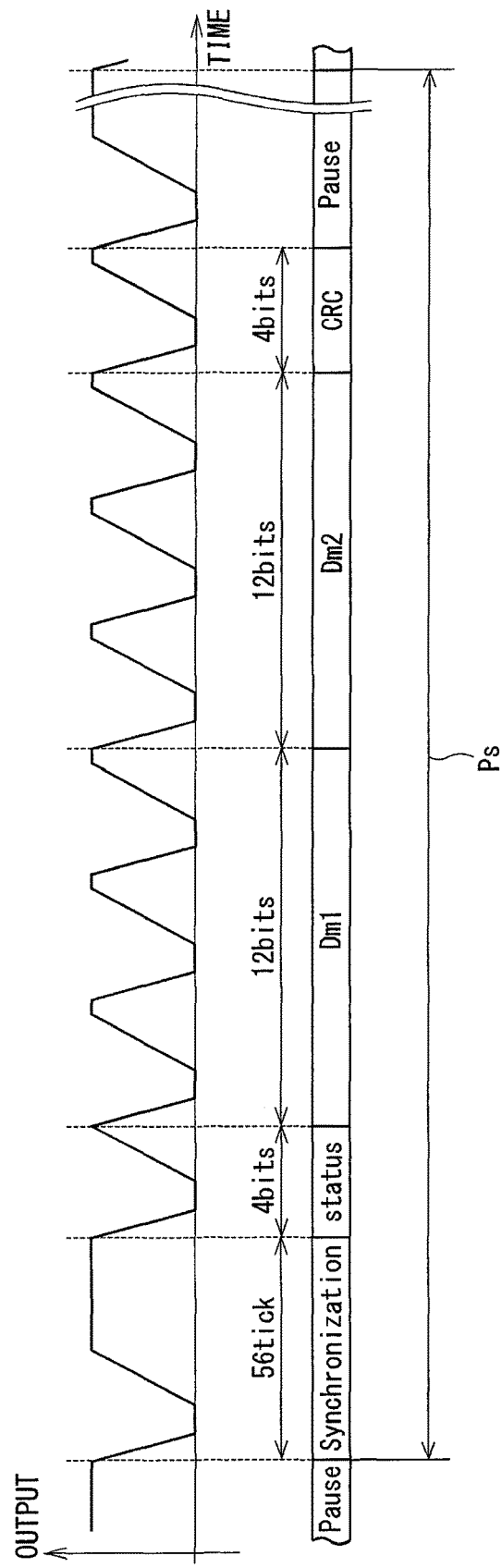
FIG. 5 is a time chart of an output signal in the first embodiment of the present disclosure.

The details of the output signal Sd11 are described based on FIG. 5. The bit number and the like shown in FIG. 5 are example numbers, and may be suitably set up according to the telecommunications standard etc.

As shown in FIG. 5, the output signal Sd11 consists of a synchronization signal, a status signal, a first data signal Dm1, a second data signal Dm2, a Cyclic Redundancy Check (CRC) signal, and a pause signal, and the output signal Sd11 is outputted as a series of those signals in this written order.

The output signal Sd12 also consists of the status signal, a first data signal Ds1, a second data signal Ds2, the CRC signal, and the pause signal; and the output signal Sd12 is outputted as a series of those signals in this written order.

Since the output signal Sd11 and the output signal Sd12 substantially have the same configuration, the following description focuses on the output signal Sd11.

The synchronization signal is a signal for synchronizing the magnetic sensor 50 with a clock of the ECU 85, and is set to 56 tick in the present embodiment. In the present embodiment, a correction coefficient is calculated based on the length of the synchronization signal, and each signal is corrected by using the calculated correction coefficient.

The first data signal Dm1 is a signal based on the sensing value of the sensor element 551, and the second data signal Dm2 is a signal based on the sensing value of the sensor element 552. In the present embodiment, the first data signal Dm1 and the second data signal Dm2 are generated based on the sensing value of the sensor elements 551 and 552 at a signal generation time.

Each of the first data signal Dm1 and the second data signal Dm2 has 3 nibbles (=12 bits) (i.e., having a total of six nibbles as a data part). The data contents may be one or more nibbles, and are specified according to the communication specification.

In the present embodiment, an internal process of the main sensor section 55 is not a process for generating one summary data based on the sensing values from the sensor elements 551 and 552 and addition/subtraction/multiplication/division of the sensing values or a selection process for selecting one of the sensing values. That is, the sensing results from the sensor elements 551 and 552 are processed by the main sensor section 55 to generate the data signals Dm1, Dm2, allowing a utilization of each of the sensing results from the elements 551, 552.

Further, in the output signal Sd12, the first data signal Ds1 is a signal based on the sensing result of the sensor element 651, and the second data signal Ds2 is a signal based on the sensing result of the sensor element 652.

Figure 6:
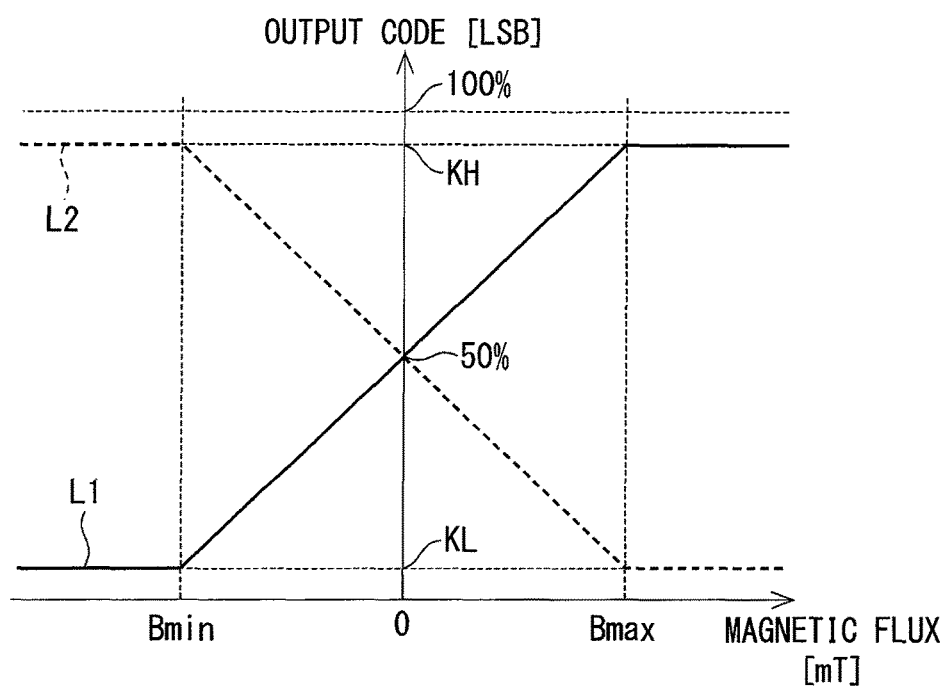
FIG. 6 is an illustration diagram of a first data signal and a second data signal in the first embodiment of the present disclosure.

As shown in FIG. 6, the data signals Dm1 and Dm2 are signals reflecting the magnetic flux between the magnetic flux collecting parts 215 and 225, and are defined as reversed signals reversed about a predetermined center value. In the present embodiment, the predetermined center value is 50% of an output code.

In detail, as shown by a solid line L1, the data signal Dm1 takes a lower limit value KL when a magnetic flux density is equal to or below Bmin, and takes an upper limit value KH when the magnetic flux density is equal to or greater than Bmax, with an increase trend of the signal as the magnetic flux density increases in a range between Bmin and Bmax. Further, as shown by a dashed line L2, the data signal Dm2 takes the upper limit value KH when the magnetic flux density is equal to or below Bmin, and takes the lower limit value KL when the magnetic flux density is equal to or greater than Bmax, with a decrease trend of the signal as the magnetic flux density increases in the range between Bmin and Bmax. Further, the value KL may be 0% of the output code, and the value KH may be 100% of the output code.

In FIG. 5, the pulse of both of the data signals Dm1 and Dm2 is represented as a single graph for illustration purposes, which actually is a pulse shown in FIG. 6 (i.e., two reversed/inverted pulses representing sensing values one of which is reversed/inverted from the other about the predetermined center value).

The data signal Ds1 is, similar to the data signal Dm1, a signal that increases as the magnetic flux density increases, and the data signal Ds2 is, similar to the data signal Dm2, a signal that decreases as the magnetic flux density increases. Further, the data signal Ds1 may be similar to the data signal Dm2 and the data signal Ds2 may be similar to the data signal Dm1, instead.

Returning to FIG. 5, the CRC signal is a signal for checking and correcting a communication error, and the length of the CRC signal is calculated based on the data signals Dm1 and Dm2.

The pause signal is a signal that is outputted in a period before an output of the next synchronization signal.

In the present embodiment, a period between a start of the synchronization signal to a start of the next synchronization signal is defined as one frame, and a period required for transmitting one frame of signals is designated as a frame period Ps (e.g., 1000 microseconds). From the main magnetic sensor 50, the output signal Sd11 is outputted to the ECU 85 at an interval of every frame period Ps. In the present embodiment, the frame period Ps corresponds to "the length of the one cycle of the output signal", or to "one signal cycle" of the output signal.

Returning to FIG. 4, the timing signal generation circuit 556 generates the timing signal St concerning the output timing of the output signal Sd12 outputted from the sub magnetic sensor 60. The generated timing signal St is transmitted to the sub magnetic sensor 60 via the fourth terminal 614 serving as the transmission terminal and the fourth terminal 524 serving as the reception terminal.

Since the sub sensor section 65 is the same configuration as the main sensor section 55, the sub sensor section 65 has the same circuit 656 as the circuit 556. However, based on the setting memorized in Electrically Erasable Programmable Read-Only Memory (EEPROM), the sub sensor section 65 is set as a sub sensor, thereby not putting the timing signal generation circuit 656 into operation.

The ECU 85 is provided as a microcontroller or the like, and has function blocks of a signal obtainer 851, an abnormality determiner 855, a cycle setter 856, and a calculator 858 together with other function blocks.

The signal obtainer 851 obtains the output signals Sd11 and Sd12 transmitted from the magnetic sensors 50 and 60.

The abnormality determiner 855 identifies a sensor element having abnormality based on a data equivalent value that is a value corresponding to the data signal (i.e., hereafter simply designated as a "data value"). Details of the abnormality determination are mentioned later.

The cycle setter 856 sets a calculation cycle of the calculator 858 according to a determination result of the abnormality determiner 855.

The calculator 858 performs various calculations using the data value of the sensor element having no abnormality. In the present embodiment, the calculator 858 calculates a steering torque based on the data value. The calculated steering torque is used for a drive control of the motor 81. More practically, the calculator 858 calculates a torque instruction value based on the steering torque. The ECU 85 controls the drive of the motor 81 by a well-known method (e.g., a feedback control), based on the torque instruction value.

Each of the processes in the ECU 85 may be software processing by an execution of a memorized program by a CPU, and/or may be hardware processing performed by an electronic circuit dedicated for such processing. The same applies to an ECU 86 to be mentioned later.

Figure 7A:
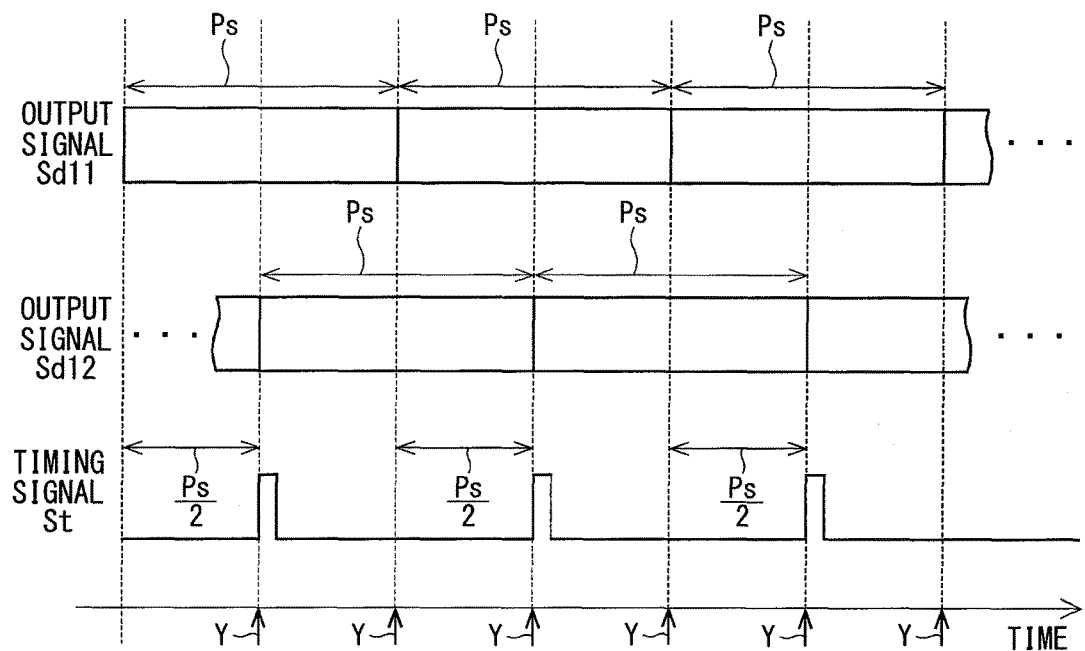
FIG. 7A is a time chart of a communication cycle in the first embodiment of the present disclosure.

Here, the transmission timing of the output signals Sd11 and Sd12 from the sensor sections 55 and 65 to the ECU 85 is described based on FIGS. 7A/B. In the present embodiment, the output signals Sd11 and Sd12 are not transmitted at a trigger signal reception timing (i.e., when the trigger signal is received from the ECU 85). Instead, the output signals Sd11 and Sd12 are transmitted to the ECU 85 from the sensor sections 55 and 65, without using the trigger signal.

Now, a communication method of transmitting the signals Sd11 and Sd12 according to the trigger signal from the ECU 85 is designated as "synchronous communications," and a communication method of transmitting the signals Sd11 and Sd12, which does not use the trigger signal from the ECU 85, is designated as "asynchronous communications". In the present embodiment, the signals Sd11 and Sd12 are transmitted by asynchronous communications, in which no trigger signal is required (i.e., no trigger signal is transmitted from the ECU 85 to the sensor sections 55 and 65). Thereby a trigger signal generation component in the ECU 85 can be eliminated therefrom. Further, the communication/signal cycle is reduced by an amount of the trigger signal.

Figure 7B:
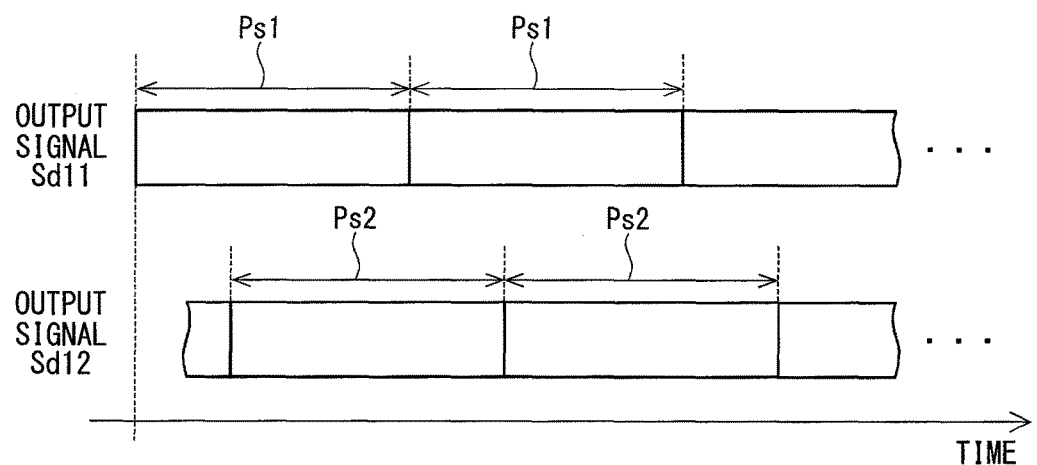
FIG. 7B is another time chart of a communication cycle in the first embodiment of the present disclosure.

When the sensor sections 55 and 65 independently transmit the output signals Sd11 and Sd12 to the ECU 85 by the asynchronous communications, the output signals Sd11 and Sd12 may be output at random due to variation of an oscillation frequency, variation of individual sensor sections, variation of a power ON timing or the like, as shown in FIG. 7B. Further, when the frame periods Ps1 and Ps2 are different periods from each other, an amount of shift between output timings of the signals Sd11 and Sd12 may change as time lapses.

Therefore, in the present embodiment, an output timing of the output signal Sd11 from the main sensor section 55 and an output timing of the output signal Sd12 from the sub sensor section 65 are controlled by transmitting the timing signal St to the sub sensor section 65 from the main sensor section 55, as shown in FIG. 7A. The timing signal St is transmitted to the sub sensor section 65 from the main sensor section 55 at a certain timing in one frame of the output signal Sd11.

In the present embodiment, the timing signal St is transmitted at a timing of one half cycle in one frame. More practically, when the length of one frame of the output signal Sd11 is Ps, the timing signal St is transmitted at a one half timing of one frame (i.e., after a (Ps/2) period from the start of the synchronization signal). Thereby, the output circuit 655 transmits the output signal Sd12 to the ECU 85 at a half-cycle shifted timing from (an output/transmission timing of) the output signal Sd11.

In FIG. 7A, each of arrows Y shows a reception completion timing of the output signals Sd11 and Sd12 in the ECU 85. By shifting the transmission timings of the output signals Sd11 and Sd12 by an amount of half cycle, the ECU 85 receives, as shown by the arrows Y, the output signals Sd11 and Sd12 at every half cycle. That is, in the ECU 85, the output signals Sd11 and Sd12 are received with a cycle of (Ps/2), which means in substance that the ECU 85 obtains steering torque information at a cycle of (Ps/2). In other words, the ECU 85 obtains the output signals Sd11 and Sd12 by turns at equal intervals.

Therefore, in comparison to a same timing transmission of both of the output signals Sd11 and Sd12 from two sensor sections 55 and 65, for example, the transmission speed on appearance is raised (i.e., a high speed communication is performable in substance). Further, in comparison to a same timing reception of both of the output signals Sd11 and Sd12 by the ECU 85, an update frequency of the output signals Sd11 and Sd12 by the ECU 85 is raised, which may, for example, improve a responsiveness at a time of steep change of the steering torque or the like.

In the present embodiment, the sensor section 55 has two sensor elements 551 and 552, and the sensor section 65 has two sensor elements 651 and 652. Further, the first data signal Dm1 according to the sensing value of the sensor element 551 and the second data signal Dm2 according to the sensing value of the sensor element 552 are included in the output signal Sd11, and the first data signal Ds1 according to the sensing value of the sensor element 651 and the second data signal Ds2 according to the sensing value of the sensor element 652 are included in the output signal Sd12.

Therefore, in the ECU 85, a total of four data signals Dm1, Dm2, Ds1, and Ds2 according to each of the sensing values of the four sensor elements 551, 552, 651, and 652 are useable/utilized. In addition, based on a majority decision, by comparing three data signals with each other, a sensor element having abnormality that is different from sky/earth fault is identifiable. In this context, the "sensor element having abnormality (or an abnormal sensor element)" not only means that the sensor element itself has abnormality, but also means that the data signal from the sensor element has abnormality due to unknown cause other than abnormality of the sensor element itself.

Based on an assumption that the abnormal sensor element is identifiable, the calculator 858 is enabled to continue the calculation based on the normal data signal as well as a high speed communication is continuable by shifting the output timings of the output signals from the sensor sections 55 and 65, even when one part of the sensor elements in each of the sensor sections 55 and 65 is abnormal (i.e., when the other part of the sensor sections 55 and 65 as a whole or at least one sensor element is surviving as a normal sensor element in each of the sensor sections 55 and 65).

Figure 8:
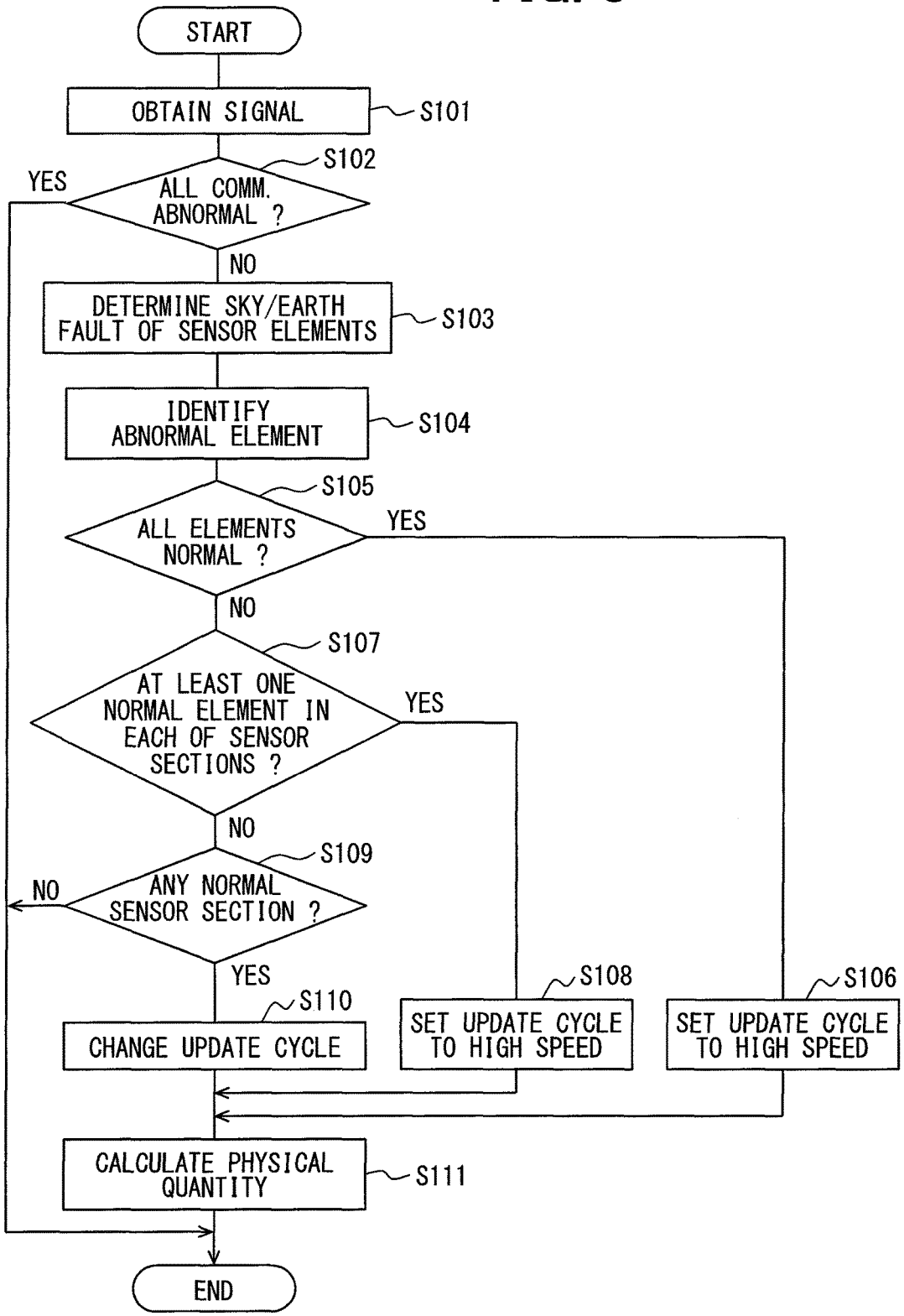
FIG. 8 is a flowchart of a communication process in the first embodiment of the present disclosure.

The abnormality determination process of the present embodiment is described based on a flowchart shown in FIG. 8. The abnormality determination process is performed when the magnetic sensors 50 and 60 and the ECU 85 are respectively turned ON.

In step S101 (hereafter, "step" is abbreviated as a letter "S"), the signal obtainer 851 obtains the output signals Sd11 and Sd12.

In S102, the abnormality determiner 855 determines whether communications to the ECU 85 from both (i.e., all) of the sensor sections 55 and 65 are abnormal based on the CRC signal. When communications to the ECU 85 from all of the sensor sections 55 and 65 are determined to be abnormal (S102:YES), a calculation of a physical quantity is not performed. When communications to the ECU 85 from at least one of the sensor sections 55 and 65 is determined to be normal (S102:NO), the process proceeds to S103.

When the sensor section 55 has abnormality in communications, a communication abnormality flag indicative of abnormality in communications of the sensor section 55 is set. When the sensor section 65 has abnormality in communications, the same flag is set.

In S103, the abnormality determiner 855 determines whether each of the sensor elements 551, 552, 651, and 652 has a sky/earth fault, or a short circuit. The data values corresponding to the data signals Dm1, Dm2, Ds1, and Ds2 are respectively designated as Vm1, Vm2, Vs1, and Vs2. The data values Vm1, Vm2, Vs1, and Vs2 take into consideration a correction process for correcting an offset error or the like as well as a reverse/inverting process, as required.

In the present embodiment, when the data value Vm1 is greater than a sky fault determination threshold value Vth1, which is an upper threshold value, it is determined that the sensor element 551 has a sky fault. When the data value Vm1 is smaller than an earth fault determination threshold value Vth2, which is a lower threshold value, it is determined that the sensor element 551 has an earth fault, or is short-circuited to the ground.

Similarly, when the data value Vm2 is greater than the sky fault determination threshold value Vth1, it is determined that the sensor element 552 has a sky fault, and when the data value Vm2 is smaller than the earth fault determination threshold value Vth2, it is determined that the sensor element 552 has an earth fault, or is short-circuited to the ground.

Further, when the data value Vs1 is greater than the sky fault determination threshold value Vth1, it is determined that the sensor element 651 has a sky fault, and when the data value Vs1 is smaller than the earth fault determination threshold value Vth2, it is determined that the sensor element 651 has an earth fault, or is short-circuited to the ground.

Similarly, when the data value Vs2 is greater than the sky fault determination threshold value Vth1, it is determined that the sensor element 652 has a sky fault, and when the data value Vs2 is smaller than the earth fault determination threshold value Vth2, it is determined that the sensor element 652 has an earth fault, or is short-circuited to the ground.

Note that "the sensor element 551 has a sky fault" means not only a sky fault of the sensor element 551 itself but also a sky fault of a circuit related to the sensor element 551. Further, "the earth fault of the sensor element 551" means not only an earth fault of the sensor element 551 itself but also an earth fault of a circuit related to the sensor element 551.

Further, when it is determined that the sensor element 551 has a sky fault or an earth fault, a sky fault flag indicative of the sky fault of the sensor element 551 or an earth fault flag indicative of the earth fault of the sensor element 551 is set. The same applies to the other sensor elements 552, 651, and 652.

In S104, the abnormality determiner 855 identifies an abnormal sensor element (i.e., identifies which one of the elements 551, 552, 651, and 652 has abnormality).

First, a situation in which all data values Vm1, Vm2, Vs1, and Vs2 are usable for abnormality monitoring is described. More practically, when the data value Vm1 is usable for abnormality monitoring, the sensor element 551 is in a state that has no communication abnormality flag, no sky fault flag, no earth fault flag, or no data abnormality flag that is mentioned later being set (i.e., being turned ON). The same applies to the other data values Vm2, Vs1, and Vs2.

When all of the data values Vm1, Vm2, Vs1, and Vs2 are usable for abnormality monitoring, in consideration of the influence of power failure or the noise, the abnormality determination is performed based on a comparison between the data values from different sensor sections.

More practically, when the abnormality determination of the sensor element 551 is performed, the data value Vm1 is compared with the data values Vs1 and Vs2, and, difference values D1, D2, and D3 are calculated by using equations (1), (2), and (3).

$$D1 = |Vm1 - Vs1| \quad \text{Equation (1)}$$

$$D2 = |Vm1 - Vs2| \quad \text{Equation (2)}$$

$$D3 = |Vs1 - Vs2| \quad \text{Equation (3)}$$

When the difference values D1 and D2 are greater than a data abnormality determination threshold value Vth3, and the difference value D3 is less than the data abnormality determination threshold value Vth3, data abnormality of the sensor element 551 is identified. When the sensor element 551 is identified as abnormal, a data abnormality flag indicative of data abnormality of the sensor element 551 is set. When abnormality of the other sensor elements 552, 651, and 652 is identified, the data abnormality flag is set for the abnormal sensor element.

The above description is an example in which the abnormality determination of the sensor element 551 does not use the data value Vm2 from the sensor element 552 that is included in the same sensor section 55 as the sensor element 551. However, the abnormality determination of the sensor element 551 may use the data value Vm2 instead of using the data value Vs1 or Vs2. The same applies to the abnormality determination of the other sensor elements.

When the abnormality determination of the sensor element 552 is performed, the data value Vm2 is compared with the data values Vs1 and Vs2, and difference values D4 and D5 are calculated by using equations (4) and (5).

$$D4 = |Vm2 - Vs1| \quad \text{Equation (4)}$$

$$D5 = |Vm2 - Vs2| \quad \text{Equation (5)}$$

When the difference values D4 and D5 are greater than the data abnormality determination threshold value Vth3 and the difference value D3 is less than the data abnormality determination threshold value Vth3, the data abnormality of the sensor element 552 is identified.

When the abnormality determination of the sensor element 651 is performed, the data value Vs1 is compared with the data values Vm1 and Vm2, and the difference values D1, D4, and D6 are calculated by using equations (1), (4), and (6).

$$D6 = |Vm1 - Vm2| \quad \text{Equation (6)}$$

When the difference values D1 and D4 are greater than the data abnormality determination threshold value Vth3 and the difference value D6 is less than the data abnormality determination threshold value Vth3, the data abnormality of the sensor element 651 is identified.

When the abnormality determination of the sensor element 652 is performed, the data value Vs2 is compared with the data values Vm1 and Vm2, and the difference values D2, D5, and D6 are calculated by using equations (2), (5), and (6).

When the difference values D2 and D5 are greater than the data abnormality determination threshold value Vth3 and the difference value D6 is less than the data abnormality determination threshold value Vth3, the data abnormality of the sensor element 652 is identified.

Next, when either a sky fault flag, an earth fault flag, or a data abnormality flag is set in one of the sensor elements 551, 552, 651, and 652, the abnormality determination is performed by using the data values corresponding to the three remaining sensor elements.

For detecting abnormality of three sensor elements that are not determined as abnormal yet, the three out of six equations (1) to (6) that are calculable by using the data values from those three sensor elements are used for the calculation of three difference values, and when all of the three difference values are less than the data abnormality determination threshold values Vth3, it is determined that these three sensor elements are normal.

On the other hand, when two of the three difference values are greater than the data abnormality determination threshold value Vth3, and one is less than the data abnormality determination threshold value Vth3, abnormality of the sensor element corresponding to the data value that is used for the calculation of both of the greater-than-threshold difference values is identified, and the data abnormality flag is set.

Next, when either a communication abnormality flag, a sky fault flag, an earth fault flag, or a data abnormality flag is set in two of the sensor elements 551, 552, 651, and 652, the abnormality determination is performed by using the data values corresponding to the two sensor elements that have no flag being set.

When the difference value of the two data values is less than the data abnormality determination threshold value Vth3, it is determined that the two sensor elements are normal.

When the difference value of the two data values is greater than the data abnormality determination threshold value Vth3, either of the two sensor elements is determined as abnormal. In this case, which one of the two sensor elements has abnormality is not determinable.

In S105, the abnormality determiner 855 determines whether all of the sensor elements 551, 552, 651, and 652 are normal. When at least one of the sensor elements 551, 552, 651, and 652 are determined as abnormal (S105:NO), the process proceeds to S107. When it is determined that all of the sensor elements 551, 552, 651, and 652 are normal (S105:YES), the process proceeds to S106.

In S106, a high speed communication mode is set by shifting and obtaining the output signals Sd11 and Sd12 at equal intervals. Further, the cycle setter 856 sets the calculation cycle of the calculator 858 to a high-speed updating state. The calculation cycle in the high-speed updating state is set to one half of the length Ps of the one frame of the output signals Sd11 and Sd12 (i.e., 500 [μs] in the present embodiment).

In S107, which is subsequent to the determination that at least one of the sensor elements 551, 552, 651, and 652 are abnormal (S105:NO), the abnormality determiner 855 determines whether at least one of the sensor element is normal in each of the sensor sections 55 and 65.

When at least one of the sensor sections 55 and 65 has all sensor elements determined as abnormal (S107:NO), the process proceeds to S109. When at least one sensor element is normal in each of the sensor sections 55 and 65 (S107:YES), the process proceeds to S108. Note that two sensor sections 55 and 65 in the present embodiment may be more than two sensor sections in other embodiments, and S107 in such case is determined as YES when at least two sensor sections among three or more have at least one normal sensor element.

In S108, a high speed communication mode is set by shifting and obtaining the output signals Sd11 and Sd12 at equal intervals. Further, the cycle setter 856 sets the calculation cycle of the calculator 858 to a high-speed updating state.

In S109, which is subsequent to the determination that at least in one of the sensor sections 55 and 65 has all sensor elements determined as abnormal (S107:NO), the abnormality determiner 855 determines whether a normal sensor section exists among the sensor sections 55 and 65. In this context, that the sensor section 55 is a "normal sensor section" means that the sensor section 55 does not have communication abnormality, and both of the sensor elements 551 and 552 do not have a sky fault or an earth fault, and the difference between the data values Vm1 and Vm2 is less than the data abnormality determination threshold value Vth3. Further, that the sensor section 65 is a "normal sensor section" means that the sensor section 65 does not have communication abnormality, and both of the sensor elements 651 and 652 do not have a sky fault or an earth fault, and the difference between the data values Vs1 and Vs2 is less than the data abnormality determination threshold value Vth3.

When it is determined that there is no normal sensor section (S109:NO) (i.e., when it is determined that neither of the sensor sections 55 and 65 is normal), a calculation of a physical quantity using the data values Vm1, Vm2, Vs1, and Vs2 is not performed.

When it is determined that there is a normal sensor section (i.e., when either one of the sensor sections 55 and 65 is normal) (S109:YES), the process proceeds to S110.

In S110, a low speed communication mode is set, in which the output signal is obtained from the normal sensor section. Further, the cycle setter 856 sets the calculation cycle in the calculator 858 to a low-speed updating state. The calculation cycle in the low-speed updating state is set to be the full length Ps of the one frame of the output signals Sd11 and Sd12 (i.e., 1000 [μs] in the present embodiment).

In S111, the calculator 858 performs a calculation of a physical quantity (i.e., a steering torque in the present embodiment) by using at least one of the normal values among the data values Vm1, Vm2, Vs1, and Vs2. When (i) at least one of the data values Vm1 and Vm2 relevant to the main sensor section 55 is normal and (ii) at least one of the data values Vs1 and Vs2 relevant to the sub sensor section 65 is normal, the calculation of a physical quantity may be performed by using the data value relevant to both of the main and sub sensor sections 55, 65, or by using the data value relevant to one of the main sensor section 55 or the sub sensor section 65.

In the present embodiment, the sensor element having abnormality is identified by the abnormality determiner 855, and, when at least one sensor element is normal in each of the sensor sections 55 and 65, the high speed communication by shifting the output timings is substantially continuable. That is, even when one of the sensor elements 551 and 552 in the sensor section 55 has abnormality, the high speed communication is continuable if the other sensor element in the sensor section 55 is normal. Similarly, even when one of the sensor elements 651 and 652 in the sensor section 65 has abnormality, the high speed communication is continuable if the other sensor element in the sensor section 65 is normal. Further, even in case of "double fault" (i.e., when one of the sensor elements 551 and 552 has abnormality, and one of the sensor elements 651 and 652 also has abnormality), the high speed communication is still continuable.

As described in details above, the sensor device 1 of the present embodiment is provided with a plurality of the sensor sections 55 and 65 and the ECU 85.

The main sensor section 55 includes the plurality of sensor elements 551, 552 sensing a physical quantity (i.e., a magnetic flux density in the present embodiment between the magnetic flux collecting parts 215, 225) of the magnetic flux collecting module 20 and the output circuit 555 generating and transmitting the output signal Sd11, including the data signals Dm1, Dm2 respectively corresponding to the sensing values sensed by the plurality of sensor elements 551, 552.

The sub sensor section 65 includes the plurality of the sensor elements 651, 652 sensing a physical quantity of the magnetic flux collecting module 20 and the output circuit 655 generating and transmitting the output signal Sd12, including the data signals Ds1, Ds2 respectively corresponding to sensing values sensed by the plurality of the sensor elements 651, 652.

The ECU 85 obtains the output signals Sd11 and Sd12. Further, the ECU 85 has the abnormality determiner 855 that identifies an abnormal sensor element (i.e., identifies which one of the sensor elements 551, 552, 651, and 652 has abnormality).

When at least one sensor element is normal in each of the two or more sensor sections 55 and 65, the main sensor section 55 transmits the output signal Sd11 to the ECU 85 at a shifted output timing from an output timing of the output signal Sd12 that is transmitted from the sub sensor section 65, and the preset amount of shift of the shifted output timing of the signal Sd11 from the output timing of the signal Sd12 is shorter than one signal cycle of the signals Sd11 and Sd12.

When at least one sensor element is normal in each of the plurality of the sensor sections 55 and 65, the sub sensor section 65 transmits the output signal Sd12 to the ECU 85 at a shifted output timing from an output timing of the output signal Sd11 that is transmitted from the main sensor section 55, and the preset amount of shift of the shifted output timing of the signal Sd12 from the output timing of the signal Sd11 is shorter than one signal cycle of the signals Sd11 and Sd12.

In the present embodiment, the sensor device 1 is provided with the plurality of the sensor sections 55 and 65, and the two or more sensor sections 55 and 65 shift the transmission timings of the output signals Sd11 and Sd12 from each other by the preset amount that is shorter than the one signal cycle.

Thereby, as compared with the case where the output signals Sd11 and Sd12 are simultaneously transmitted from the plurality of the sensor sections 55 and 65, the data update frequency in the ECU 85 is raised, and the communication speed is raised on appearance.

Further, since the ECU 85 can identify the sensor element having abnormality, the ECU 85 can continue the calculation of the torque by using the data value of the normal sensor element.

In the plurality of the sensor sections 55 and 65, if at least one the sensor element is normal in each section, the data update frequency of the ECU 85 is increasable by shifting the transmission timings of the output signals Sd11 and Sd12. That is, even in case that the abnormality is caused in some of the sensor elements, the high speed communication is substantially continuable.

The abnormality determiner 855 identifies an abnormal sensor element (i.e., identifying which one of the sensor elements 551, 552, 651, and 652 has abnormality). Further, by comparing three or more data values Vm1, Vm2, Vs1, and Vs2, the abnormality determiner 855 appropriately determines an abnormal sensor element by a majority decision principle.

When identifying abnormality of the sensor element 551, the abnormality determiner 855 compares the data value Vm1 concerning the sensor element 551 with the data values Vs1, Vs2 concerning the sensor elements 651 and 652 that are disposed in the different sensor section 65 being different from the sensor section 55 having the sensor element 551, which is a subject of the abnormality determination. Similarly, when identifying abnormality of the sensor element 552, the data value Vm2 is compared with the data values Vs1 and Vs2 by the abnormality determiner 855.

Further, the abnormality determiner 855 compares the data value Vs1 concerning the sensor element 651 with the data values Vm1, Vm2 concerning the sensor elements 551 and 552 that are disposed in the different sensor section 55 being different from the sensor section 65 having the sensor element 651, when identifying abnormality of the sensor element 651. Similarly, when identifying abnormality of the sensor element 652, the data value Vs2 is compared with the data values Vm1 and Vm2 by the abnormality determiner 855.

In such manner, an abnormal sensor element is appropriately identified by preventing an influence of a false determination due to the power abnormality, the noise or the like caused in the same sensor section.

When the data value Vm1 is greater than the sky fault determination threshold value Vth1, or when the data value Vm1 is smaller than the earth fault determination threshold value Vth2, the abnormality determiner 855 identifies the sensor element 551 corresponding to the data value Vm1 as having abnormality.

Further, when the data value Vm2 is greater than the sky fault determination threshold value Vth1, or when the data value Vm2 is smaller than the earth fault determination threshold value Vth2, the abnormality determiner 855 identifies the sensor element 552 corresponding to the data value Vm2 as having abnormality.

Further, when the data value Vs1 is greater than the sky fault determination threshold value Vth1, or when the data value Vs1 is smaller than the earth fault determination threshold value Vth2, the abnormality determiner 855 identifies the sensor element 651 corresponding to the data value Vs1 as having abnormality.

Further, when the data value Vs2 is greater than the sky fault determination threshold value Vth1, or when the data value Vs2 smaller than an earth fault determination threshold value Vth2, the abnormality determiner 855 identifies the sensor element 652 corresponding to the data value Vs2 as having abnormality.

Thereby, the sky fault and the earth fault of the sensor elements 551, 552, 651, and 652 are appropriately identified.

The main sensor section 55 has the timing signal generation circuit 556 that is capable of transmitting the timing signal St, for instructing the other sensor section (i.e., the sub sensor section 65) about the transmission timing of transmitting the output signal Sd12 from the sub sensor section 65 to the ECU 85.

Thereby, the transmission timing of transmitting the output signal Sd11 from the main sensor section 55 and the transmission timing of transmitting the output signal Sd12 from the sub sensor section 65 are appropriately controllable.

Further, in the present embodiment, the trigger signal triggering the data transmission is not transmitted to the sensor sections 55 and 65 from the ECU 85.

Thereby, the configuration or a component concerning the generation of the trigger signal in the ECU 85 is omissible.

In the present embodiment, all of the sensor sections 55 and 65 have timing signal generation circuits 556 and 656. In other words, the same configuration among the sensor sections 55 and 65 enables a reduction of the number of component types used in the sensor device 1.

The sealed parts 53 and 63 sealing the sensor sections 55 and 65 are provided for each of the sensor sections 55 and 65. In the present embodiment, the first terminal group 51 protrudes from the first side surface 531 of the sealed part 53, the second terminal group 52 protrudes from the second side surface 532 of the sealed part 53, when the first side surface 531 is provided on one side of the sealed part 53 and the second side surface 532 is provided on the other (i.e., opposite) side thereof. Further, first terminal group 61 protrudes from the first side 631 of the sealed part 63, the second terminal group 62 protrudes from the second side 632 of the sealed part 63, when the first side 631 is provided on one side of the sealed part 63 and the second side 632 is provided on the other, (i.e., opposite) side thereof.

The first terminal groups 51, 61 and the second terminal groups 52, 62 include the reception terminal for receiving the timing signal St and the transmission terminal for transmitting the timing signal St. In such manner, when the sensor sections 55 and 65 have the same configuration, and are arranged side by side, facing the same direction, the terminal groups 52, 61 arranged on the "inside" of the two sections 55, 65 provide the reception terminal and the transmission terminal for the exchange of the timing signal St therebetween, thereby simplifying the signal wire 115 used for the transmission of the timing signal St between the transmission terminal and the reception terminal.

In the first terminal groups 51 and 61, the n th terminals (i.e., 4th terminal in the present embodiment) 514 and 614 from the one ends 535 and 635 of the sealed parts 53 and 63 are used as the reception terminal and the m th terminals (i.e., 6th in the present embodiment) 516 and 616 therefrom are used as the transmission terminal.

Further, in the second terminal groups 52 and 62, the n th terminals (i.e., 4th in the present embodiment) 524 and 624 from the one ends 535 and 635 of the sealed parts 53 and 63 are used as the transmission terminal, and the m th terminals (i.e., 6th in the present embodiment) 526 and 626 therefrom are used as the reception terminal.

In such manner, given that the one ends 535 and 635 of the sealed parts 53 and 63 are substantially aligned with each other and the sensor sections 55 and 65 are disposed side-by-side, facing the same direction, the reception terminal and the transmission terminal are adjacently positioned to each other, thereby enabling a simple shape of the signal wire 115 for the transmission and reception of the timing signal St.

The output signals Sd11 and Sd12 from the sensor sections 55 and 65 are transmitted to the ECU 85 for the reception at equal intervals on an ECU 85 side. Thereby, the ECU 85 receives the output signals Sd11 and Sd12 at a constant frequency.

The sensor elements 551, 552, 651, and 652 of the present embodiment are the magnetic flux sensing elements which sense change of the magnetic flux of the sensing object. The sensor elements 551, 552, 651, and 652 sense change of the magnetic flux that changes according to the torque. More practically, change of the magnetic flux according to the amount of twist displacement of the torsion bar 13 in the steering system 90 is sensed, and the sensor device 1 is used as the torque sensor 10.

Thereby, the steering torque is appropriately sensed/detectable. Further, even when a part of the sensor elements 551, 552, 651, and 652 have abnormality, the ECU 85 can continue the calculation of the steering torque with the same accuracy as the normal time, while continuing abnormality monitoring.

The electric power steering apparatus 80 is provided with the sensor device 1, the motor 81, and the speed reduction gear 82. The motor 81 outputs the assist torque for assisting the steering operation of the steering wheel 91 by the driver. The speed reduction gear 82 transmits the torque of the motor 81 to the steering shaft 92 (i.e., to the drive object). the ECU 85 controls the drive of the motor 81 based on the steering torque calculated based on at least one of the data signals Dm1, Dm2, Ds1, and Ds2.

Since the electric power steering apparatus 80 of the present embodiment can continue assistance of the steering operation of the steering wheel 91 by the driver according to the steering torque, even when a part of the sensor elements 551, 552, 651, and 652 has abnormality, thereby contributing to an improvement of the vehicle safety.

As for the ECU 85, when continuing the assistance of the steering operation after having abnormality in a part of the sensor elements 551, 552, 651, and 652, it is desirable for the ECU 85 to let the driver know about the abnormality in a part of the sensor elements by using a warning lamp, by sound, or the like.

In the present embodiment, the main sensor section 55 and the sub sensor section 65 correspond to a "sensor section", and the abnormality determiner 855 corresponds to an "abnormality determiner."

Second Embodiment

Figure 9:
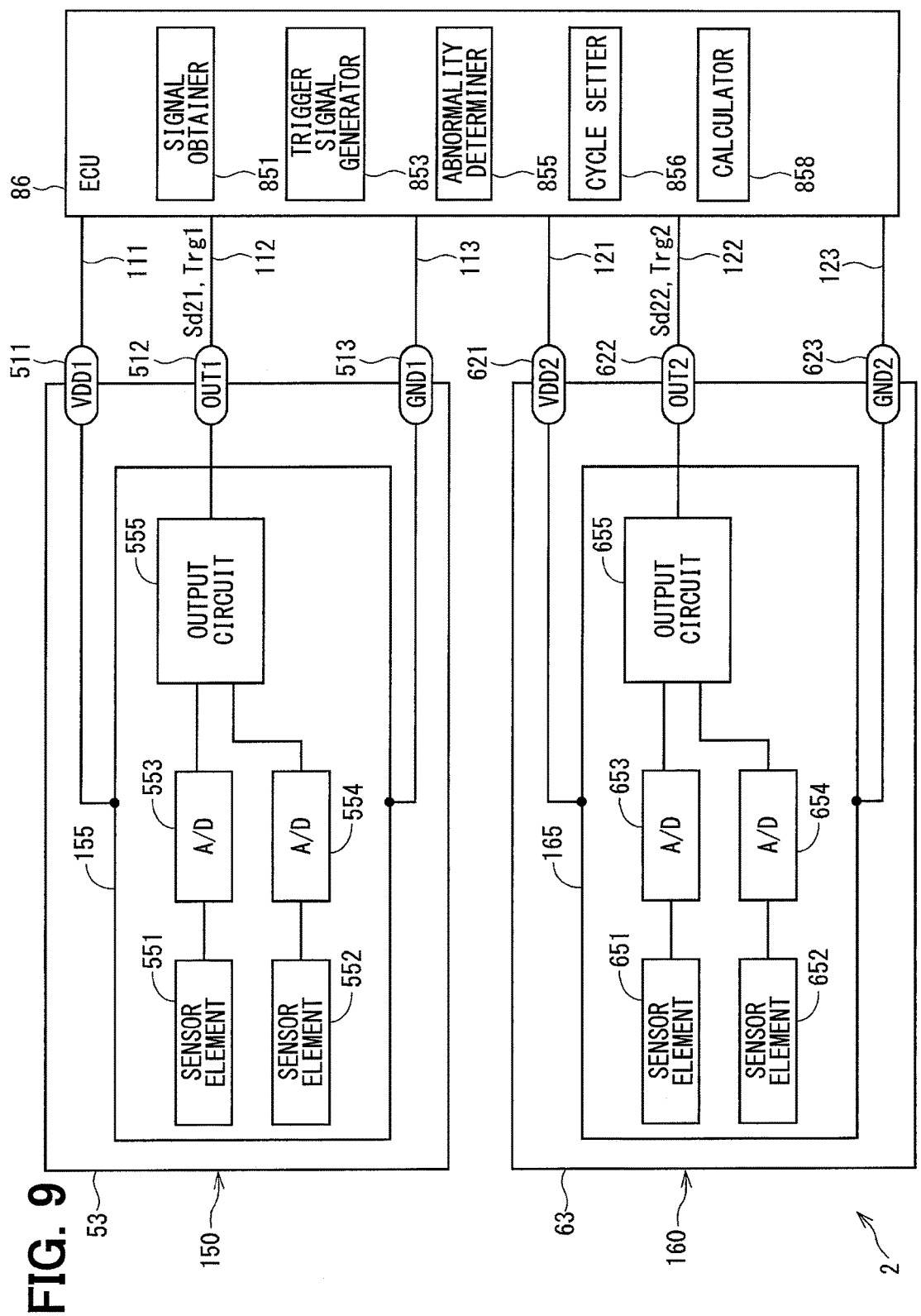
FIG. 9 is a block diagram of the sensor device in a second embodiment of the present disclosure.
Figure 10:
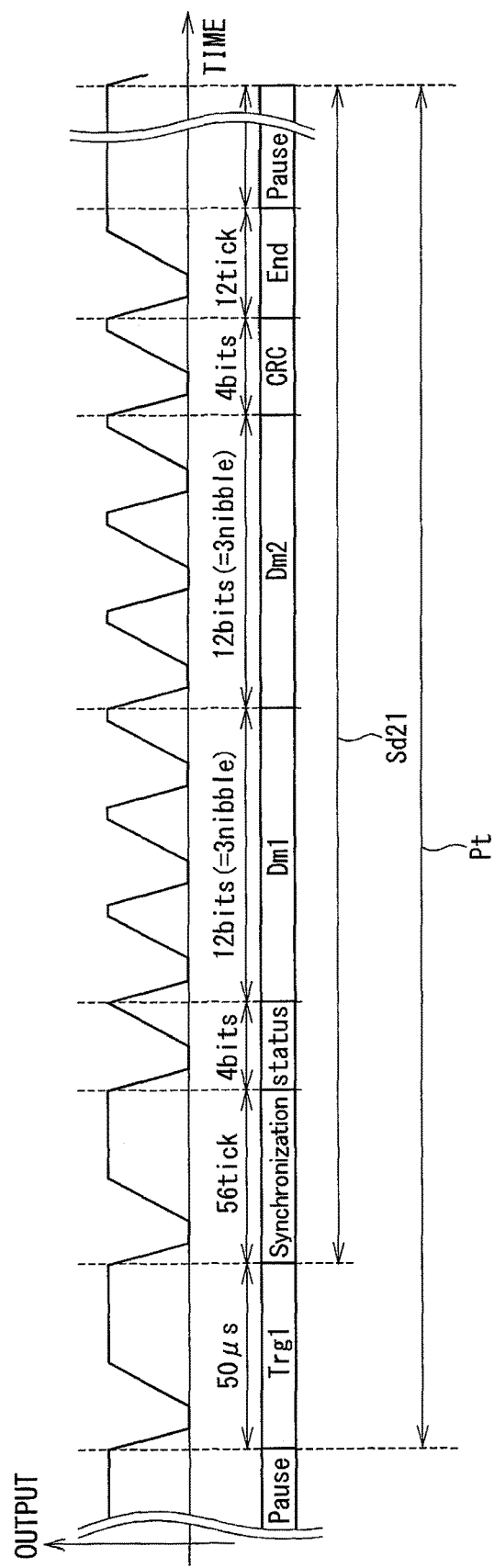
FIG. 10 is a time chart of a trigger signal and an output signal in the second embodiment of the present disclosure.
Figure 11:
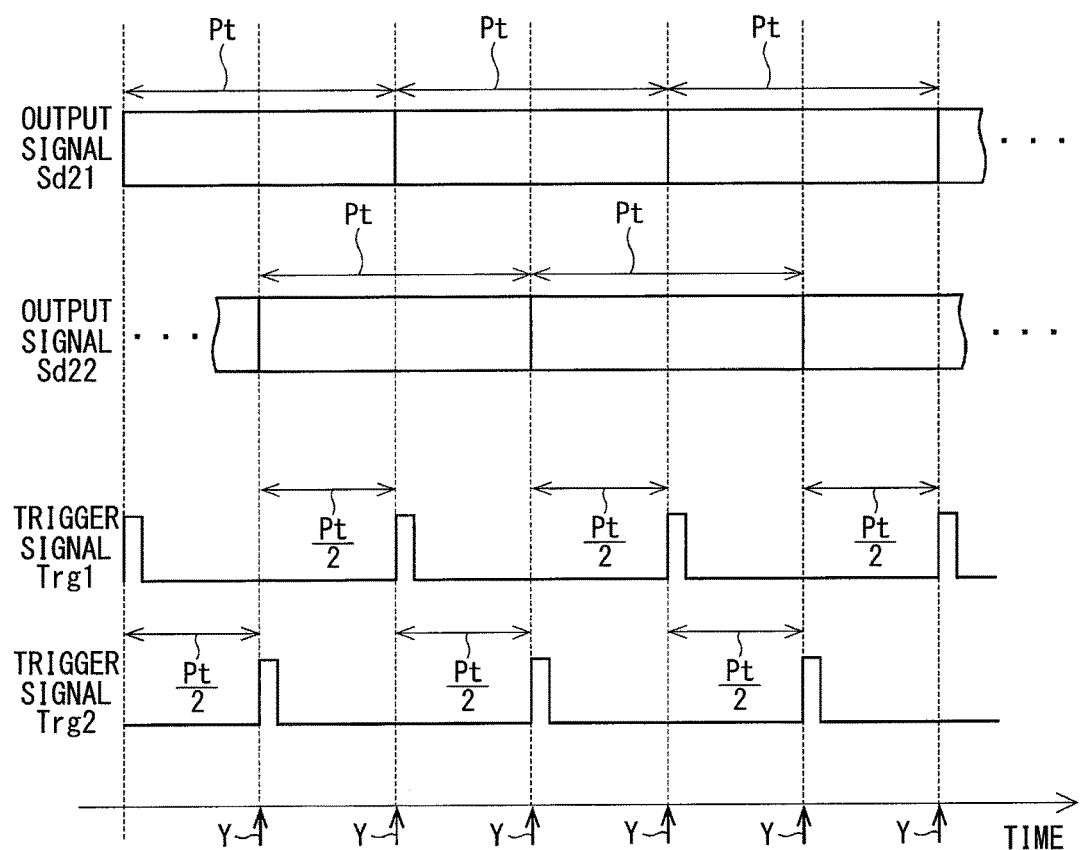
FIG. 11 is a time chart of the communication cycle in the second embodiment of the present disclosure.

The second embodiment of the present disclosure is described based on FIGS. 9-11.

As shown in FIG. 9, a sensor device 2 of the present embodiment is provided with a main magnetic sensor 150, a sub magnetic sensor 160, the ECU 86 as a controller and the like.

The ECU 86 controls the drive of the motor 81 based on the steering torque that is calculated based on output signals Sd21 and Sd22 outputted from the magnetic sensors 150 and 160. The difference of the ECU 86 from the ECU 85 is that the ECU 86 has a trigger signal generator 853 in addition to the signal obtainer 851, the abnormality determiner 855, the cycle setter 856, and the calculator 858.

The trigger signal generator 853 generates a trigger signal Trg1 requesting a transmission of the output signal Sd21. The trigger signal Trg1 is transmitted to a main sensor section 155 via the second terminal 512 of the first terminal group 51 which is the communication terminal of the communication line 112.

The trigger signal generator 853 generates a trigger signal Trg2 requesting a transmission of the output signal Sd22. The trigger signal Trg2 is transmitted to a sub sensor section 165 via the second terminal 622 of the second terminal group 62 which is the communication terminal of the communication line 122.

About the other points, the ECU 86 is substantially the same as the ECU 85 of the first embodiment.

The main magnetic sensor 150 has the main sensor section 155.

The main sensor section 155 has the sensor elements 551 and 552, the A/D-conversion circuits 553 and 554, and the output circuit 555. That is, the main sensor section 155 is different from the above-mentioned embodiment in that the timing signal generation circuit 556 is omitted therefrom.

The output circuit 555 generates the output signal Sd21 based on the sensing values which are sensed by the sensor elements 551 and 552 and converted by the A/D conversion, when the trigger signal Trg1 is transmitted. The generated output signal Sd21 is transmitted to the ECU 86 in digital communications via the second terminal 512 which serves as the communication terminal.

The sub magnetic sensor 160 has the sub sensor section 165.

The sub sensor section 165 has the sensor elements 651 and 652, the A/D-conversion circuits 653 and 654, and the output circuit 655. That is, the sub sensor section 165 is different from the above-mentioned embodiment in that the timing signal generation circuit 656 is omitted therefrom.

The output circuit 655 generates the output signal Sd22 based on the sensing values which are sensed by the sensor elements 651 and 652 and converted by the A/D conversion, when the trigger signal Trg2 is transmitted. The generated output signal Sd22 is transmitted to the ECU 86 in digital communications via the second terminal 622 which serves as the communication terminal.

In the present embodiment, the output signals Sd21 and Sd22 are transmitted just like the above-mentioned embodiment by the SENT communication which is digital communications.

In the present embodiment, the timing signal St is not transmitted from the main sensor section 155 to the sub sensor section 165, thereby the terminals serving as the transmission terminal and the reception terminal are not provided. Except for such difference, the configuration of the terminal groups and the sealed parts is the same as the first embodiment.

That is, in the present embodiment, for the description purpose, even though "the main sensor section 155" and "the sub sensor section 165" have respectively different numerals, the functions of the main sensor section 155 and the sub sensor section 165 are the same.

The details of the output signal Sd21 are described based on FIG. 10.

The bit number and the like in FIG. 10 are example numbers, and may be suitably set up according to the telecommunications standard etc.

In the present embodiment, the output signal Sd21 consists of the synchronization signal, the status signal, the first data signal Dm1, the second data signal Dm2, the CRC signal, an end signal, and the pause signal, and the output signal Sd21 is outputted as a series of those signals in this written order. The synchronization signal, the status signal, the first data signal Dm1, the second data signal Dm2, and the CRC signal are the same as the above-mentioned embodiment.

The end signal is a signal that indicates that an output of the first data signal and the second data signal, both of which are the data signals, is finished.

After the output of the end signal until the detection of the next trigger signal Trg1, the pause signal is outputted.

In the present embodiment, the communication line 112 is used for (i) the transmission of the trigger signal Trg1 from the ECU 86 to the main sensor section 155 and (ii) the transmission of the output signal Sd21 from the main sensor section 155 to the ECU 86. Therefore, the signal obtainer 851 obtains the output signal Sd21 subsequently after obtaining the trigger signal Trg1.

In the present embodiment, a period from the start of the trigger signal Trg1 to the start of the next trigger signal Trg1 is considered as one frame.

In the present embodiment, a transmission period required for a transmission of a signal in one frame is designated as a frame period Pt (e.g., 1000 microseconds). From the main magnetic sensor 150, the output signal Sd21 is outputted to the ECU 86 at an interval of every frame period Pt.

In the present embodiment, the frame period Pt corresponds to "the length of the one cycle of the output signal."

Similarly, the communication line 122 is used for (i) the transmission of the trigger signal Trg2 from the ECU 86 to the sub sensor section 165 and (ii) the transmission of the output signal Sd22 from the main sensor section 165 to the ECU 86. Therefore, the signal obtainer 851 obtains the output signal Sd22 subsequently after obtaining the trigger signal Trg2.

Since the output signal Sd22 is the same as the output signal Sd21, except for a change of the data signals Dm1 and Dm2, which are replaced with the data signals Ds1 and Ds2, the description about the output signal Sd22 is omitted.

The transmission timing of the output signals Sd21 and Sd22 from the sensor sections 155 and 165 to the ECU 86 is described based on FIG. 11. In the present embodiment, in response to a transmission of the trigger signals Trg1 and Trg2 from the ECU 86, the sensor sections 155 and 165 transmit the output signals Sd21 and Sd22, which is the "synchronous communications". By performing the synchronous communications, the ECU 86 is enabled to obtain the output signals Sd21 and Sd22 respectively at desired timings.

As shown in FIG. 11, the trigger signals Trg1 and Trg2 are transmitted to the sensor sections 155 and 165 from the ECU 86 at a timing shifted by an amount of half cycle of the frame period Pt of the output signals Sd21 and Sd22. In other words, the trigger signal Trg2 is transmitted to the sub sensor section 165 at a (Pt/2)-after timing from the start of transmission of the trigger signal Trg1, and the trigger signal Trg1 is transmitted to the main sensor section 155 at a (Pt/2)-after timing from the start of transmission of the trigger signal Trg2.

Thereby, the output signals Sd21 and Sd22 are transmitted to the ECU 86 respectively at a shifted output timing shifted by an amount of half cycle from the output signals Sd22 and Sd21.

By transmitting the output signals Sd21 and Sd22 by half cycle, the output signals Sd21 and Sd22 are received for every half cycle on the ECU 86 side, just like the above-mentioned embodiment. That is, the ECU 86 receives the output signal Sd21 and Sd22 at the cycle of (Pt/2), which means that the ECU 86 obtains the information concerning the steering torque at the cycle of (Pt/2). In other words, the ECU 86 obtains the output signal Sd21 and Sd22 alternately in turns at equal intervals.

Since the update period of the output signals Sd21 and Sd22 is shorter as compared with the case that the output signals Sd21 and Sd22 are simultaneously transmitted from the two sensor sections 155 and 165, for example, the transmission speed is raised on appearance and the high speed communication is substantially enabled.

Further, since the update frequency of the output signals Sd21 and Sd22 in the ECU 86 is raised as compared with the case in which the output signals Sd21 and Sd22 are simultaneously obtained, the responsiveness at a time of steep change of the steering torque, etc. is improved, for example.

The details of the abnormality determination process are the same as that of the above-mentioned embodiment.

In the present embodiment, the ECU 86 transmits, to the sensor sections 155 and 165, the trigger signals Trg1, Trg2 which respectively instruct the transmission timings of the output signals Sd21 and Sd22. Thereby, the ECU 86 can obtain the output signals Sd21 and Sd22 respectively at the desired timings.

Further, the same effects as the above-mentioned embodiment are achievable.

In the present embodiment, the main sensor section 155 and the sub sensor section 165 respectively correspond to a "sensor section", and the trigger signals Trg1 and Trg2 respectively correspond to a "timing signal."

Other Embodiments

Although the present disclosure has been described in connection with preferred embodiment thereof with reference to the accompanying drawings, it is to be noted that various changes and modifications will become apparent to those skilled in the art.

(a) Sensor Section

According to the above-mentioned embodiments, two sensor elements are provided in one sensor section.

According to other embodiments, three or more sensor elements may be provided in one sensor section.

When three or more sensor elements are provided in one sensor section, the high speed communication is continuable even when plural sensor elements are abnormal, (i.e., if at least one sensor element is normal). Further, if three or more sensor elements are normal as a whole sensor device, the abnormal sensor element is identifiable. Further, if two sensor elements are normal as a whole sensor device, abnormality monitoring is continuable even though the abnormal sensor element is not identifiable.

According to the above-mentioned embodiments, the sensing values sensed by the two sensor elements in the same sensor section are outputted as the data signals having data values which are reversed/inverted from each other.

According to other embodiments, the data values corresponding to the sensing values sensed by the two sensor elements in the same sensor section do not need to be reversed from each other.

According to the above-mentioned embodiments, the signal for checking the communication error is the CRC signal.

According to other embodiments, as long as the signal is usable for checking the communication error in the controller/the ECU, the signal may not only be the CRC signal, but also any kind of signal. Further, the output signal does not need to include the communication error detection signal for sensing the communication error.

According to other embodiments, information on an updating counter updated for every transmission of the output signal may also be included in the output signal. The information on the updating counter can be included, for example, in a status signal. By transmitting the information on the updating counter, the same data transmitted twice is distinguished as to whether (i) the same data is yielded twice from the same sensing value or (ii) a data adhesion error is caused due to a stop of the data update.

The data signal is expressed with nibble in the above-mentioned embodiments.

In other embodiments, the first main signal, the first sub signal, the second main signal, and the second sub signal may be expressed with a format other than nibble.

According to the above-mentioned embodiments, the output signal is transmitted to the controller by SENT communication.

According to other embodiments, as long as plural data signals are included in the output signal, any communication method other than SENT communication may be used.

According to the above-mentioned embodiments, the number of the sensor sections is two, and the output signal is transmitted to the controller at a shifted timing shifted by an amount of half cycle of the output signal among the sensor sections.

According to other embodiments, the sensor section may transmit the output signal to the controller among two or more sensor sections at a shifted timing shifted by an amount (i) shorter than the length of one cycle of the output signal and (ii) different from one half cycle of the output signal.

According to other embodiments, the three or more sensor sections may be provided. In such case, the output signal outputted from each of the three or more sensor sections is transmitted by a predetermined shift amount. The transmission intervals of the output signals outputted from the three or more sensor sections may be different from each other, and the transmission intervals may preferably be equal intervals.

When the number of the sensor sections is three or more, the high speed communication in a cycle shorter than the signal cycle of the output signal is continuable even if some sensor sections become abnormal (i.e., if two or more sensor sections are normal).

Further, when a part of the sensor sections newly becomes abnormal (i.e., when the number of normal sensor sections is changed) the communication cycle may be appropriately changed for allowing the normal sensor sections to transmit the output signals at equal intervals.

According to the above-mentioned embodiments, the plurality of sensor sections have the same configuration.

According to other embodiments, the configuration of the plurality of sensor sections may be different. For example, the signal generation circuit may be omitted from the sub sensor section of the first embodiment.

According to the second embodiment, the output circuit generates the output signal based on the sensing value which is sensed by the sensor element and converted by the A/D conversion, when the trigger signal is transmitted.

According to other embodiments, the sensing value is continuously updated in the sensor section at the predetermined update cycle that is shorter than the frame period without the trigger signal, and when the trigger signal is transmitted, the output signal may be generated in the sensor section by using the latest one of the sensing values.

In not only the synchronous communications described in the second embodiment, but also in the asynchronous communication described in the first embodiment, the sensing value may be updated at the predetermined update cycle that is shorter than the frame period, and the output signal may similarly be generated by using the latest sensing value.

According to the above-mentioned embodiments, the sensor element is a Hall element.

According to other embodiments, the sensor elements may be the magnetic flux sensing elements other than the Hall element, and may be the elements which detect the change of a physical quantity other than the magnetic flux.

According to the above-mentioned embodiments, the sensor section is used for sensing the steering torque as the torque sensor.

According to other embodiments, the sensor section may serve as a sensor other than the torque sensor (i.e., may serve as a pressure sensor for sensing pressure, for example). In other words, the physical quantity calculated by the calculator may be a torque other than the steering torque, or may be not only a torque but any physical quantity.

According to the above-mentioned embodiments, the sensing object is the magnetic flux collecting module.

According to other embodiments, the sensing object may be any object other than the magnetic flux collecting module.

According to the above-mentioned embodiments, the sealed part is provided for every sensor section.

According to other embodiments, plural sensor sections may be sealed in one sealed part, and may be provided as one package. For example, as shown in the first embodiment, when transmitting the timing signal to the sub magnetic sensor from the main magnetic sensor, the main sensor section and the sub magnetic sensor section may be sealed in one package as the sealed part, and the transmission and reception of the timing signal are performed in an inside of the sealed part, for the reduction of the terminals used for such transmission and reception of the timing signal.

According to the above-mentioned embodiments, the magnetic sensor is provided as a Small Outline Package (SOP) type that has the terminals on both sides of the sealed part.

According to other embodiments, the terminal may be provided on other sides other than the first side and the second side of the sealed part (e.g., the Quad Flat Package (QFP) type having the terminals on four sides of the sealed part. Further, the power supply terminal, the communication terminal, the ground terminal, the transmission terminal, and the reception terminal may be respectively assigned to a different terminal from the one described in the above-mentioned embodiments. According to the above-mentioned embodiments, the two magnetic sensors are mounted on the same side of the one substrate positioned side by side.

According to other embodiments, plural magnetic sensors may be mounted on both sides of the substrate etc., or may be mounted in any arrangement on the substrate. Further, plural magnetic sensors may not be necessarily mounted on the same substrate.

(b) Abnormality Determiner

According to the above-mentioned embodiments, the controller has the abnormality determiner.

According to other embodiments, the sensor section may perform the abnormality determination in part or as a whole. In other words, the sensor section may have the abnormality determiner, or the controller and the sensor section may both have the abnormality determiner.

For example, a self-monitoring may be performed by comparing the sensing values of the sensor elements in the sensor section, and a self-monitoring result may be transmitted to the controller within the sensor section.

Further, at least one sensor section may obtain the sensing value from other sensor sections, and may perform the abnormality determination process within the sensor section, and may transmit the abnormality determination result to the controller.

(c) Sensor Device

In the above-mentioned embodiments, the sensor device is applied to the electric power steering apparatus.

In other embodiments, the sensor device may be applied to other in-vehicle apparatuses other than the electric power steering apparatus, and may also be applied to other apparatuses which are not disposed in a vehicle.

Such changes, modifications, and summarized schemes are to be understood as being within the scope of the present disclosure as defined by appended claims.

What is claimed is:

1. A sensor device for use in an electric power steering apparatus, the sensor device comprising:
   a plurality of sensor sections respectively including:
      a plurality of sensor elements configured to sense a physical quantity of a sensing object; and
      an output circuit configured to generate and transmit an output signal, the output signal including data signals respectively corresponding to sensing values sensed by the plurality of sensor elements; and
   a controller configured to obtain the output signal, wherein
   at least one of the controller and the plurality of sensor sections is further configured to identify a sensor element having an abnormality, and
   at least two sensor sections are further configured to respectively transmit the output signal to the controller at shifted output timings shifted from each other, with an amount of shift of the shifted output timings configured as shorter than one signal cycle of the output signal, when at least two sensor sections have at least one normal sensor element.

2. The sensor device of claim 1, wherein
   at least one of the controller and the plurality of sensor sections is further configured to identify that the sensor element has an abnormality by comparing at least three data equivalent values that respectively correspond to the data signals.

3. The sensor device of claim 2, wherein
   at least one of the controller and the plurality of sensor sections is further configured to identify that the sensor element has an abnormality by comparing a data equivalent value from a subject sensor element with a data equivalent value from another sensor element belonging to a different sensor section than a corresponding sensor section having the subject sensor element.

4. The sensor device of claim 1, wherein
   the at least one of the controller and the plurality of sensor sections is further configured to determine that the sensor element has an abnormality, when a data equivalent value corresponding to a data signal is greater than an upper threshold value, or is smaller than a lower threshold value.

5. The sensor device of claim 1, wherein
   at least one of the plurality of sensor sections includes a timing signal generation circuit configured to transmit a timing signal to other sensor sections of the plurality of sensor sections that instructs a transmission timing of the output signal from the other sensor sections to the controller.

6. The sensor device of claim 5, wherein
   all of the plurality of sensor sections include the timing signal generation circuit.

7. The sensor device of claim 6, wherein
   each of the plurality of sensor sections includes a sealed part, and
   a first terminal group and a second terminal group respectively include a reception terminal configured to receive the timing signal, and a transmission terminal configured to transmit the timing signal, upon
   designating a first group of terminals protruding from a first side surface of the sealed part as the first terminal group, and
   designating a second group of terminals protruding from a second side surface of the sealed part as the second terminal group.

8. The sensor device of claim 7, wherein
   an n-th terminal in the second terminal group that is arranged as the n-th from one end of the sealed part is the transmission terminal, and
   an m-th terminal in the second terminal group that is arranged as the m-th from, the one end of the sealed part is the reception terminal, upon
   setting the n-th terminal in the first terminal group that is arranged as the n-th from one end of the sealed part as the reception terminal, and
   setting the m-th terminal in the first terminal group that is arranged as an m-th from the one end of the sealed part as the transmission terminal.

9. The sensor device of claim 1, wherein
   the controller is further configured to transmit, to the plurality of sensor sections, a timing signal that instructs a transmission timing of the output signal.

10. The sensor device of claim 1, wherein
    the output signal from the plurality of sensor sections is configured to be obtained by the controller at equal intervals.

11. The sensor device of claim 1, wherein
    each of the plurality of sensor elements comprises a magnetic field sensing element further configured to sense a change of magnetic flux from the sensing object.

12. The sensor device of claim 11, wherein
    each of the plurality of sensor elements is further configured to sense a change of magnetic flux according to a change of torque.

13. An electric power steering apparatus comprising:
    a sensor device having:
       a plurality of sensor sections respectively including:
          a plurality of sensor elements configured to sense a change of magnetic flux from a sensing object; and
          an output circuit configured to generate and to transmit an output signal, the output signal including data signals respectively corresponding to the change of magnetic flux sensed by the plurality of sensor elements; and
       a controller configured to obtain the output signal, wherein
          at least one of the controller and the plurality of sensor sections is further configured to identify a sensor element having an abnormality, and
          at least two sensor sections are further configured to respectively transmit the output signal to the controller at shifted output timings shifted from each other, with an amount of shift of the shifted output timings configured as shorter than one signal cycle of the output signal, when at least two sensor sections have at least one normal sensor element;
    a motor configured to output an assist torque for assisting a steering operation of a steering member; and
    a power transmission part configured to transmit the assist torque of the motor to a drive object, wherein
       the controller of the sensor device drives the motor based on a steering torque that is calculated based on at least one data signal, and wherein
       each of the plurality of sensor elements is further configured to sense a change of magnetic flux according to a change of torque.

* * * * *